(12) United States Patent
Miyoshi et al.

(10) Patent No.: US 8,891,622 B2
(45) Date of Patent: Nov. 18, 2014

(54) MOTION PICTURE CODING APPARATUS, MOTION PICTURE CODING METHOD AND COMPUTER READABLE INFORMATION RECORDING MEDIUM

(75) Inventors: Hidenobu Miyoshi, Kawasaki (JP); Hisanari Kimura, Fukuoka (JP); Shotaro Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 324 days.

(21) Appl. No.: 13/462,643

(22) Filed: May 2, 2012

(65) Prior Publication Data

US 2013/0028323 A1    Jan. 31, 2013

(30) Foreign Application Priority Data

Jul. 28, 2011  (JP) .................................. 2011-165946

(51) Int. Cl.
*H04N 7/12* (2006.01)
*H04N 19/18* (2014.01)
*H04N 19/152* (2014.01)
*H04N 19/132* (2014.01)
*H04N 19/174* (2014.01)
*H04N 19/176* (2014.01)
*H04N 19/147* (2014.01)
*H04N 19/61* (2014.01)
*H04N 19/11* (2014.01)

(52) U.S. Cl.
CPC ... *H04N 19/00296* (2013.01); *H04N 19/00193* (2013.01); *H04N 19/00127* (2013.01); *H04N 19/00272* (2013.01); *H04N 19/00278* (2013.01); *H04N 19/00175* (2013.01); *H04N 19/00781* (2013.01); *H04N 19/00042* (2013.01)
USPC ............ 375/240.13; 375/240.12; 375/240.14; 375/240.25; 382/232

(58) Field of Classification Search
CPC .................. H04N 19/00278; H04N 19/00109; H04N 19/00121; H04N 19/00139; H04N 19/00296; H04N 19/00315; H04N 19/00369; H04N 19/00503; H04N 19/00521; H04N 19/00533; H04N 19/00551; H04N 19/00781; H04N 19/00
USPC ...................................................... 375/240.13
See application file for complete search history.

(56) References Cited

U.S. PATENT DOCUMENTS 6,693,961 B1 * 2/2004 Azadegan ................ 375/240.11
6,763,070 B1   7/2004 Lee (Continued)

FOREIGN PATENT DOCUMENTS

JP         2010-87771         4/2010

OTHER PUBLICATIONS

Patent Abstracts of Japan, Publication No. 2010-087771, Published Apr. 15, 2010.
http://www.mpeg.org/MPEG/MSSG/tm5/Ch10/Ch10.html_2012/04/24, "10 Rate Control and Quantization Control", pp. 1-5.

(Continued)

*Primary Examiner* — Jessica M Prince
(74) *Attorney, Agent, or Firm* — Staas & Halsey LLP

(57) ABSTRACT

A motion picture coding apparatus divides an image into plural blocks and codes the image; determines a coding mode to be used for each of the blocks; determines, for coefficients of each of the plural blocks coded in the determined coding mode, a position for which coefficients in the block are replaced by "0" based on rate information; determines whether a to-be-processed block is a first block for which referring to pixel values of an upward adjacent block is not allowed; changes, for coefficients of a block of DC components after orthogonal transformation or quantization in the block determined as the first block, the determined position to a position at which the number of coefficients to be replaced by "0" is reduced; and replaces coefficients of the block of DC components after orthogonal transformation or quantization in the block determined as the first block based on the changed position.

7 Claims, 19 Drawing Sheets

PERIPHERAL PIXEL
AVERAGE PREDICTION

HORIZONTAL PREDICTION

(56) References Cited

U.S. PATENT DOCUMENTS

| | | | |
|---|---|---|---|
| 2003/0223492 A1 | 12/2003 | Drezner et al. | |
| 2005/0163216 A1* | 7/2005 | Boon et al. | 375/240.12 |
| 2007/0083578 A1* | 4/2007 | Chen et al. | 708/203 |
| 2009/0028246 A1* | 1/2009 | Miyoshi et al. | 375/240.16 |
| 2010/0303153 A1* | 12/2010 | Kadono | 375/240.13 |
| 2012/0128064 A1* | 5/2012 | Sato | 375/240.03 |
| 2012/0195379 A1* | 8/2012 | Alshin et al. | 375/240.12 |
| 2012/0230417 A1* | 9/2012 | Sole Rojals et al. | 375/240.18 |
| 2013/0272397 A1* | 10/2013 | Sato et al. | 375/240.12 |

OTHER PUBLICATIONS

Extended European Search Report issued Aug. 29, 2012 in corresponding European Patent Application No. 12165942.9.

Shujun Li et al., "An Improved DC Recovery Method From AC Coefficients of DCT-Transformed Images", Proceedings of the 2010 IEEE $17^{th}$ International Conference on Image Processing, Sep. 26-29, 2010, pp. 2085-2088.

Gary J. Sullivan et al., "The H.264/AVC Advanced Video Coding Standard: Overview and Introduction to the Fidelity Range Extensions", Proceedings of SPIE, vol. 5558, Nov. 2004, pp. 454-474.

* cited by examiner

○ PIXELS TO BE CODED
● PERIPHERAL PIXELS TO BE USED FOR PREDICTION

PERIPHERAL PIXEL AVERAGE PREDICTION

HORIZONTAL PREDICTION

VERTICAL PREDICTION

PLANE PREDICTION

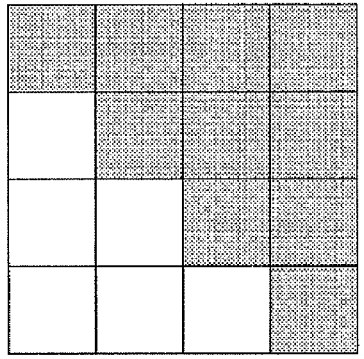
FIG.8C POSITION (LEVEL 4)
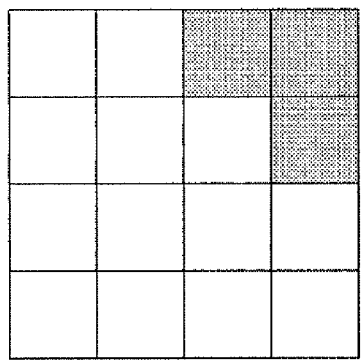
FIG.8B POSITION (LEVEL 2)
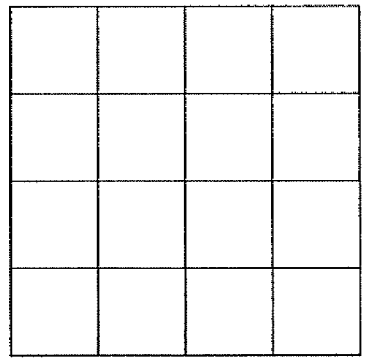
FIG.8A POSITION (LEVEL 0)
FIG.8D
| x\y | 0 | 1 | 2 | 3 |
|---|---|---|---|---|
| 0 | 0 | 1 | 2 | 3 |
| 1 | 1 | 2 | 3 | 4 |
| 2 | 2 | 3 | 4 | 5 |
| 3 | 3 | 4 | 5 | 6 |

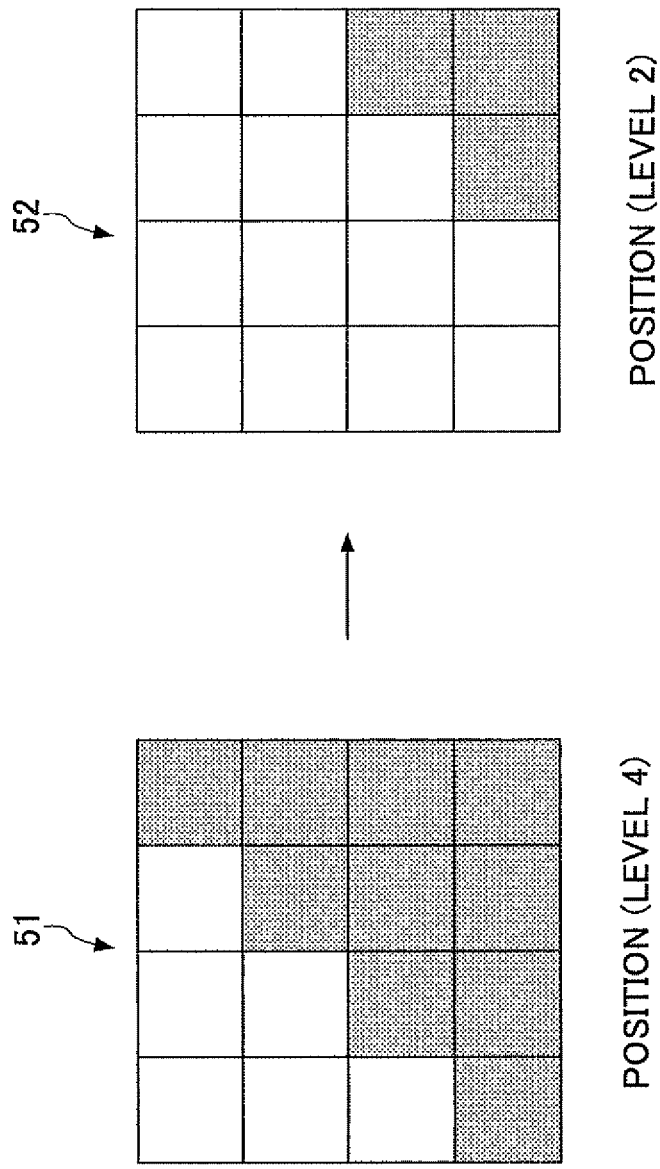

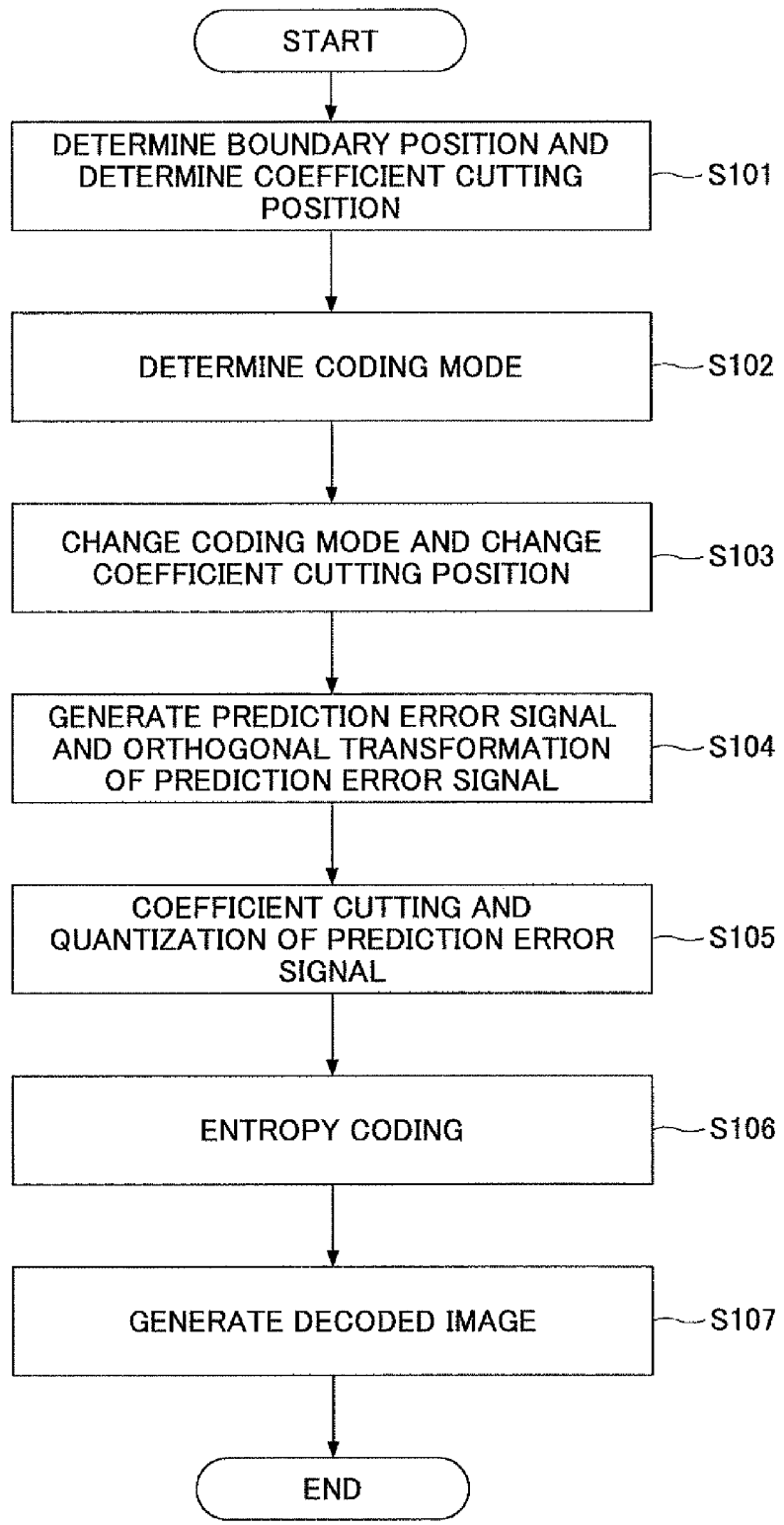

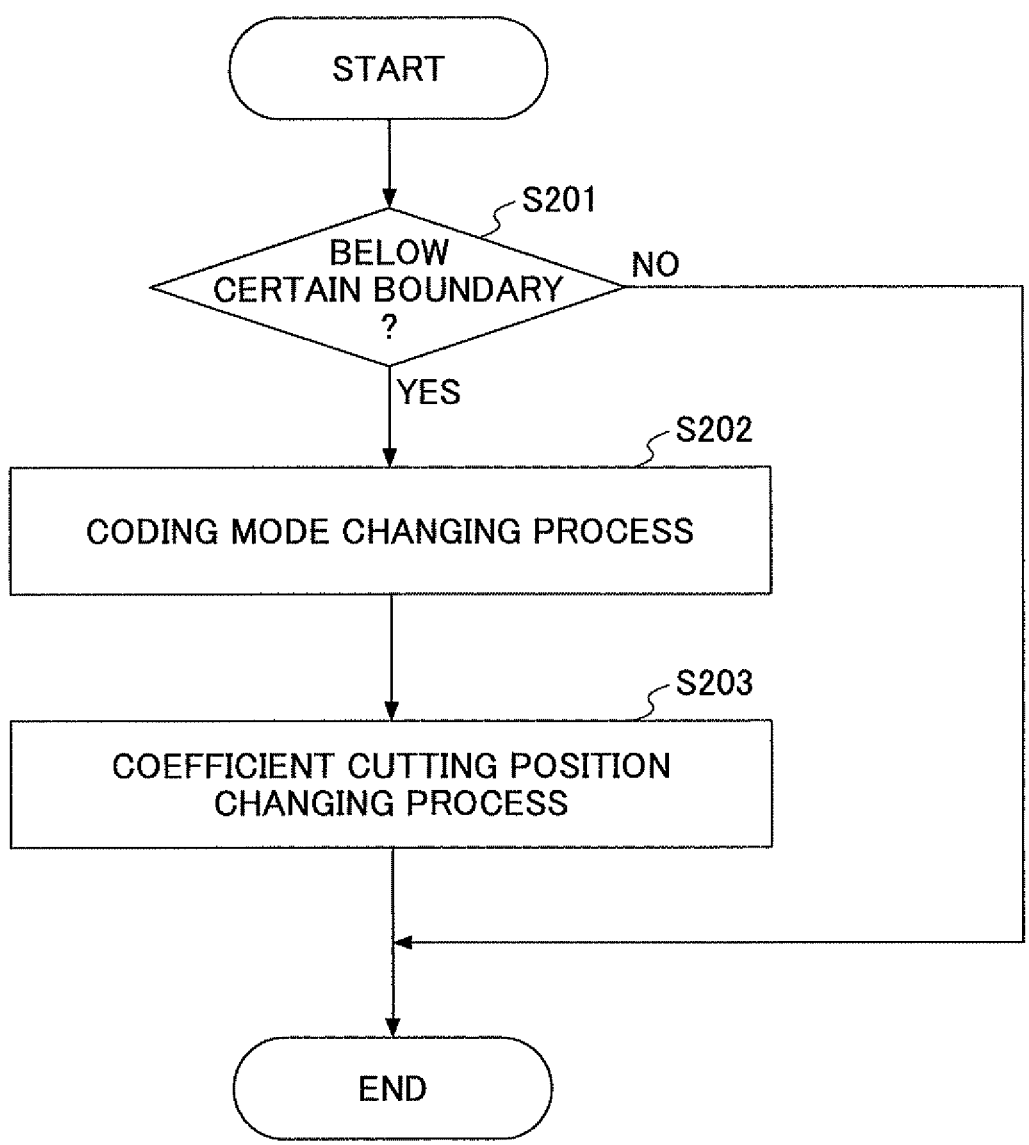

MOTION PICTURE CODING APPARATUS, MOTION PICTURE CODING METHOD AND COMPUTER READABLE INFORMATION RECORDING MEDIUM

CROSS-REFERENCE TO RELATED APPLICATIONS

This application is based upon and claims the benefit of priority of the prior Japanese Patent Application No. 2011-165946, filed on Jul. 28, 2011, the entire contents of which are incorporated herein by reference.

FIELD

The embodiments discussed herein are directed to a motion picture coding apparatus, a motion picture coding method and a computer readable information recording medium.

BACKGROUND

Generally speaking, image data, in particular, motion picture data, has a large data amount. Therefore, when image data is transmitted from a transmission apparatus to a reception apparatus, or when image data is stored in a storage unit, motion picture coding is previously carried out. "Motion picture coding" means the coding process of converting a certain data sequence to another data sequence, and means the process of compressing the data amount. As a typical motion picture coding method, H.264/AVC (ITU-T H.264/ISO/IEC MPEG-4AVC) may be cited.

A motion picture signal has a luminance signal and a color-difference signal. Motion picture coding is carried out on a YUV (YCbCr) signal, for example. There are color formats, i.e., 4:2:0, 4:2:2, 4:4:4 and so forth, depending on information amounts of the color-difference signal with respect to the luminance signal.

Motion picture includes plural pictures. In motion picture coding, generally speaking, a picture is divided into plural blocks (macroblocks), and a slice having the plural macroblocks is formed. A macroblock includes, for example, 16×16 pixels. One picture includes one or more slices.

According to H.264/AVC, in order to conform to a profile defined in the standard, there is a case where one picture is divided into plural slices. As the profile, a case of High 10 Profile, High 4:2:2 Profile, or the like, for example, may be cited.

In motion picture coding including H.264/AVC, when a macroblock is coded, generally classifying, there are two types of prediction methods, i.e., intra-frame prediction (intra prediction) and inter-frame prediction (inter prediction).

According to intra prediction, peripheral pixels of a target macroblock in a frame are used, and pixel differences are coded. At this time, prediction across a slice boundary is not performed. On the other hand, according to inter prediction, an already coded picture is referred to, and motion vectors and pixel differences are coded.

There are three types of pictures depending on coding methods. I-pictures are coded only by intra prediction. P-pictures are coded using intra prediction and inter prediction, but a reference direction for an already coded picture is limited to a forward direction. B-pictures are coded using intra prediction and inter prediction, and as a reference direction for an already coded picture, both forward and backward directions may be selected.

Next, intra prediction will be described. According to intra prediction, pixel values of left, upward and left-upward adjacent already coded blocks may be referred to. As a coding method to be used to code a luminance signal, a selection is made from coding modes of Intra 16×16, Intra 8×8 and Intra 4×4, depending on respective block sizes in intra prediction. For these coding modes, directions of adjacent pixels that may be referred to for prediction are prescribed, respectively. According to Intra 16×16, a selection may be made from 4 direction modes. According to Intra 8×8 and Intra 4×4, a selection may be made from 9 direction modes.

As to a coding method to be used to code a color-difference signal, prediction is carried out in only a 8×8 block unit in a case of the 4:2:0 format, and a prediction direction may be selected from 4 direction modes. The same or similar way applies to a case of the 4:2:2 format.

FIGS. 1A, 1B, 1C and 1D depict prediction directions according to intra prediction for a color-difference signal. As depicted in FIGS. 1A, 1B, 1C and 1D, there are 4 types of prediction directions for a color-difference signal according to intra prediction, i.e., peripheral pixel average prediction (DC prediction) (FIG. 1A), horizontal prediction (FIG. 1B), vertical prediction (FIG. 1C) and plane prediction (FIG. 1D). Only in a case of the peripheral pixel average prediction (DC prediction), internal pixels are divided into 4×4 blocks, and in each block, averages are obtained while upward and left peripheral pixel values are referred to. Hereinafter, intra prediction for a color-difference signal may be also simply referred to as "color-difference intra".

Orthogonal transformation and coefficient cutting will now be described. Generally speaking, in an image signal, correlation between adjacent pixels is high. When orthogonal transformation is used, bias occurs in frequency components of transformed coefficients, and respective coefficients from low frequency to high frequency are calculated. The lowest frequency component is called a direct-current (DC) component, and the other components are called alternate-current (AC) components.

Generally speaking, high-frequency components (absolute values) are smaller than low-frequency components (absolute values). According to H.264/AVC, discrete cosine transform (DCT) or discrete Hadamard transform (DHT) is used as orthogonal transformation, and orthogonal transformation is carried out in 4×4-pixel units or 8×8-pixel units.

FIG. 2 depicts an example of DCT in 4×4-pixel units. In the example of FIG. 2, a 16×16-pixel luminance macroblock 11 is divided into 16 4×4-pixel blocks, and DCT is carried out on each of the 16 blocks. In the block (for example, a block 13 in FIG. 2) obtained from DCT, the coefficient of DC component (20 in the example of FIG. 2) is larger while the other coefficients of AC components are smaller.

A block 12 depicted in FIG. 2 represents a 4×4-pixel block before DCT. When DCT is carried out on the coefficients of the block 12, the coefficients are transformed into coefficients of the block 13. The top-left coefficient in the block 13 corresponds to a coefficient of the DC component 20.

The coefficients after undergoing DCT are quantized according to a quantization parameter. The quantization parameter is set so that a designated bit rate may be ensured. Such a control method is called "rate control", and a method according to Test Model 5 (TM5) is a common method thereof.

As to the quantization parameter, the maximum value is determined in the standard, and setting a value higher than the maximum value is not allowed. Therefore, in order to realize a low video rate operation, there is a method in which transformed coefficients are forcibly changed into "0" while image quality is degraded accordingly. Such a method is called "coefficient cutting". Coefficient cutting means a replacement of a coefficient(s) by "0".

As a technology of carrying out "coefficient cutting", there is a technique, for example, in which an adjustment is carried out in such a manner that quantized coefficients are replaced by "0" for a certain block based on an estimated code amount of a to-be-processed block and a target code amount.

PATENT REFERENCE

Patent reference No. 1: Japanese Laid-Open Patent Publication No. 2010-87771

In a case of "coefficient cutting", when coefficients of DC components of a low frequency are cut, an image quality considerably degrades. Therefore, generally speaking, degradation in image quality is reduced by carrying out "coefficient cutting" from AC components of high frequencies. FIG. 3 depicts one example of coefficient cutting. As depicted in FIG. 3, coefficients of AC components 21, 22 and 23 in a block 13 are replaced by "0" in a block 14. In the example of FIG. 3, "coefficient cutting" is carried out on the frequency components after undergoing orthogonal transformation. However, it is also possible to carry out "coefficient cutting" on coefficients after undergoing quantization.

On the other hand, an orthogonal transformation method differs depending on respective "block sizes in intra prediction" (i.e., "Intra block size"), as follows.

According to Intra 16×16 mentioned above, 4×4 integer-precision DCT is carried out. Thus, the total 16 blocks are coded. Then, further 4×4 DHT is carried out on a block including the thus obtained 16 DC components. Therefore, in this case, the total 17 blocks are thus coded.

According to Intra 8×8 mentioned above, a 16×16 macroblock is divided into 4 8×8 blocks, and orthogonal transformation of 8×8 integer-precision DCT is carried out on the respective 4 blocks.

According to Intra 4×4 mentioned above, a 16×16 macroblock is divided into 16 4×4 blocks, and orthogonal transformation of 4×4 integer-precision DCT is carried out on the respective 16 blocks.

According to color-difference intra mentioned above, in a case of 4:2:0, a macroblock size is 8×8. Therefore, orthogonal transformation of integer-precision DCT is carried out on the 4 4×4 blocks. Further, on the DC components, 2×2 DHT is carried out. In a case of 4:2:2, a macroblock size is 8×16, and orthogonal transformation of integer-precision DCT is carried out on the 8 4×4 blocks. Further, in this case, on the DC components, 2×4 DHT is carried out.

FIG. 4 depicts an example of carrying out color-difference intra on the 8×8-pixel macroblock. A macroblock 31 depicted in FIG. 4 includes 8×8 pixels. The macroblock 31 is divided into the 4 4×4 blocks, and a DCT process is carried out on the 4 blocks. The DC components of the respective 4 blocks 41, 42, 43 and 44 are collected, and a block 32 is generated. The block 32 is a block including 2×2 DC components. DHT is carried out on the block 32 and a block 33 is obtained. The frequency coefficients of the block 33 after undergoing DHT are then quantized and coded.

Next, "slice dividing" in a case of H.264/AVC will be described. FIG. 5 depicts an example of dividing a 1920× 1088 picture into 4 slices. One slice includes one or plural blocks. Here, for the sake of simplifying explanation, a picture to be coded is an I-picture that includes slices. I-pictures are coded by only intra prediction.

According to the standard of H.264/AVC, in a case where an image size is 1920×1088 in High 4:2:2 Profile, a picture is divided into four or more slices.

Here, a macroblock line below a slice boundary will now be considered. Further, a picture boundary may be considered the same as or similar to the slice boundary. The boundaries exist on the 0-th, 17-th, 34-th and 51-st macroblock lines, respectively, as depicted in FIG. 5.

Concerning each of these macroblock lines below the respective slice boundaries, since prediction across a slice boundary is not allowed according to the standard, referring to pixel values in a macroblock on an upward adjacent block line is not allowed.

Therefore, according to the standard of H.264/AVC, "peripheral pixel average prediction" or "horizontal prediction", described above using FIGS. 1A and 1B, is selected. In a case where peripheral pixel average prediction is selected, since referring to pixel values in an upward adjacent block is not allowed, consequently only pixel values in the horizontal directions are referred to and prediction is carried out. As a result, coding errors may occur relatively remarkably for the macroblock lines below the respective slice boundaries.

According to color-difference intra, as described above, orthogonal transformation of DCT and DHT is carried out, and there is a block in which DC component are collected other than blocks of AC components. At this time, in a case where "coefficient cutting" is carried out according to the related art, coefficients in the DC components are also cut. Therefore, coding errors may occur further remarkably. Further, also in a case of Intra 16×16, since a block of DC components is generated, the same problem may occur as that in the color-difference intra in a case where "coefficient cutting" is carried out according to the related art.

In a case where coding is carried out at a low bit rate, line-shaped noises (degradation in image quality) may be visible along block line boundaries due to an influence of the coding errors caused by "coefficient cutting". Also as to P-pictures and B-pictures, since "intra prediction" may be carried out, the same problem may occur.

SUMMARY

According to an embodiment of the present invention, a motion picture coding apparatus includes a coding part configured to divide an image into plural blocks and code the plural blocks of the image; a mode determination part configured to determine a coding mode for each of the blocks; a position determination part configured to determine, for coefficients of the block coded according to the coding mode determined by the mode determination part, a position for which coefficients of the block are replaced by "0" based on rate information; a block determination part configured to determine whether a to-be-processed block is a first block for which referring to pixel values of an upward adjacent block are not allowed; a changing part configured to change, for coefficients of a block of DC components after undergoing orthogonal transformation or quantization in the to-be-processed block determined as the first block, the position determined by the position determination part to a position at which the number of coefficients to be replaced by "0" is reduced; and a coefficient cutting part configured to replace, based on the position changed by the changing part, coefficients of the block of DC components after undergoing orthogonal transformation or quantization in the to-be-processed block determined as the first block.

The object and advantages of the disclosure will be realized and attained by means of the elements and combinations particularly pointed out in the claims.

It is to be understood that both the foregoing general description and the following detailed description are exemplary and explanatory only and are not restrictive of the invention, as claimed.

BRIEF DESCRIPTION OF DRAWINGS

FIGS. 8A, 8B, 8C and 8D depict one example of coefficient cutting on levels;

FIGS. 9A and 9B depict one example of coefficient cutting position changing;

FIG. 10 is a flowchart depicting one example of a coding process according to the embodiment 1;

FIG. 11 is a flowchart depicting one example of a changing process according to the embodiment 1;

DESCRIPTION OF EMBODIMENTS

The embodiments of the present invention will now be described in detail using accompanying drawings.

Embodiment 1

Configuration

Figure 1A:
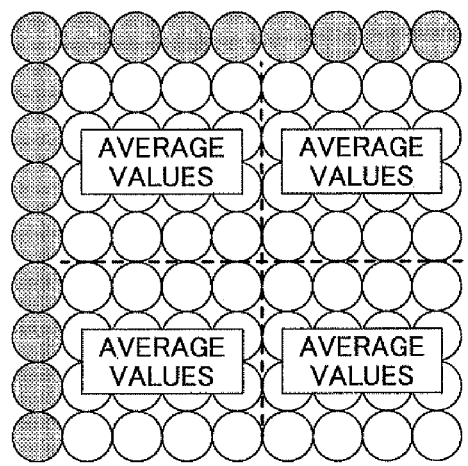
FIGS. 1A, 1B, 1C and 1D illustrate prediction directions of intra prediction for a color-difference signal.
Figure 1B:
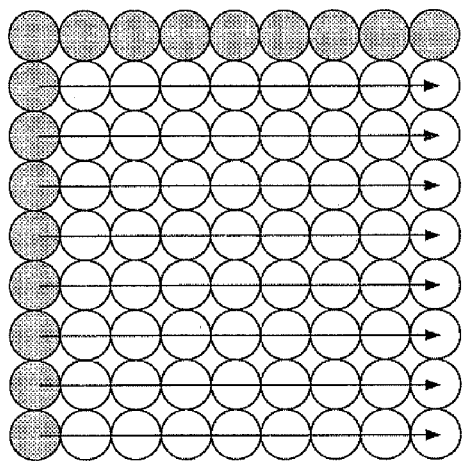
Figure 1C:
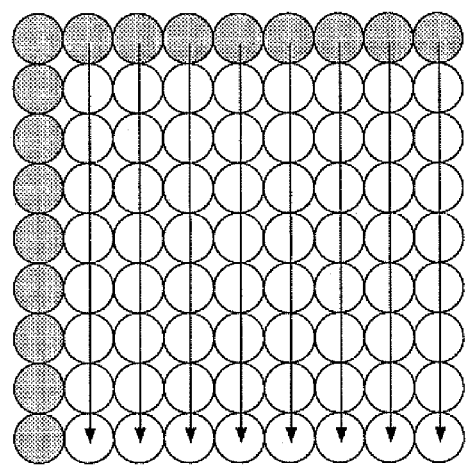
Figure 1D:
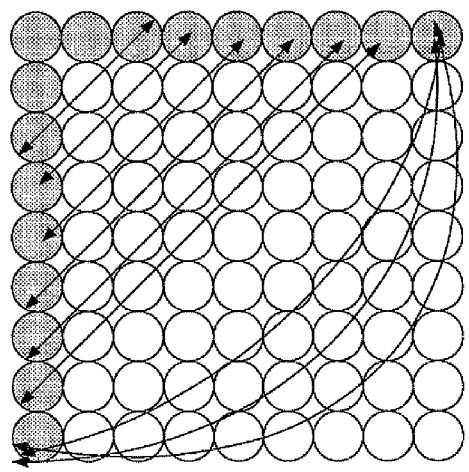
Figure 2:
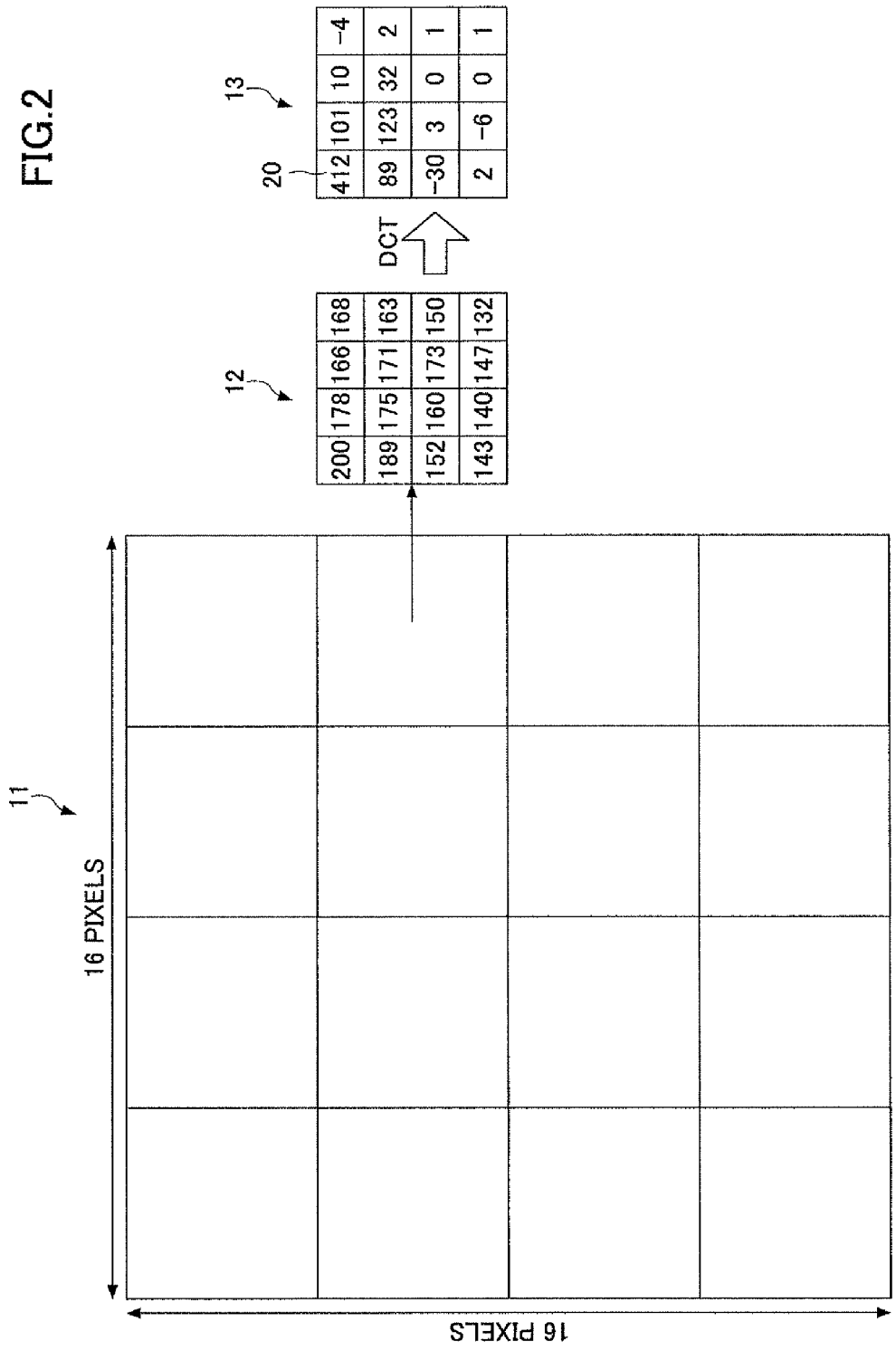
FIG. 2 depicts an example of DCT in 4×4-pixel units.
Figure 3:
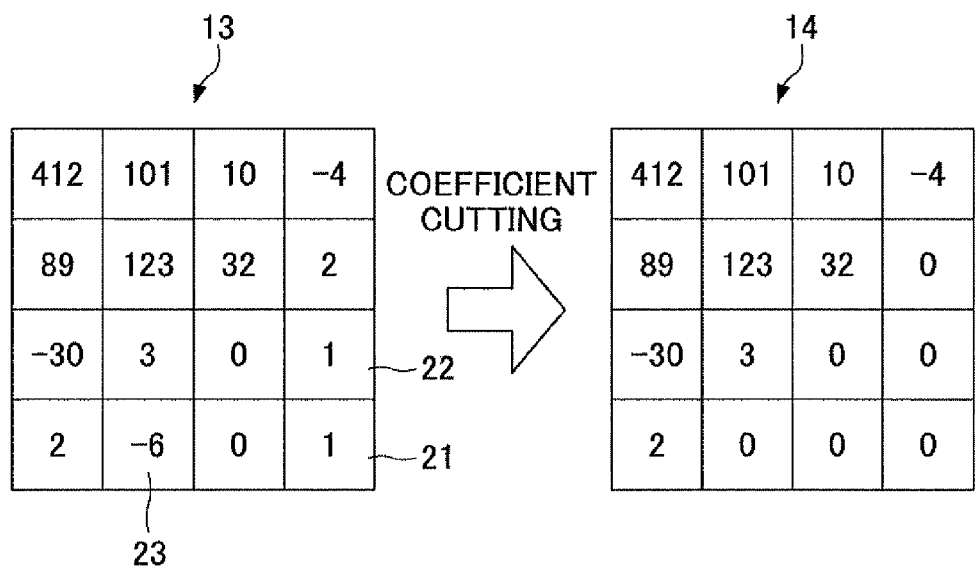
FIG. 3 depicts an example of coefficient cutting.
Figure 4:
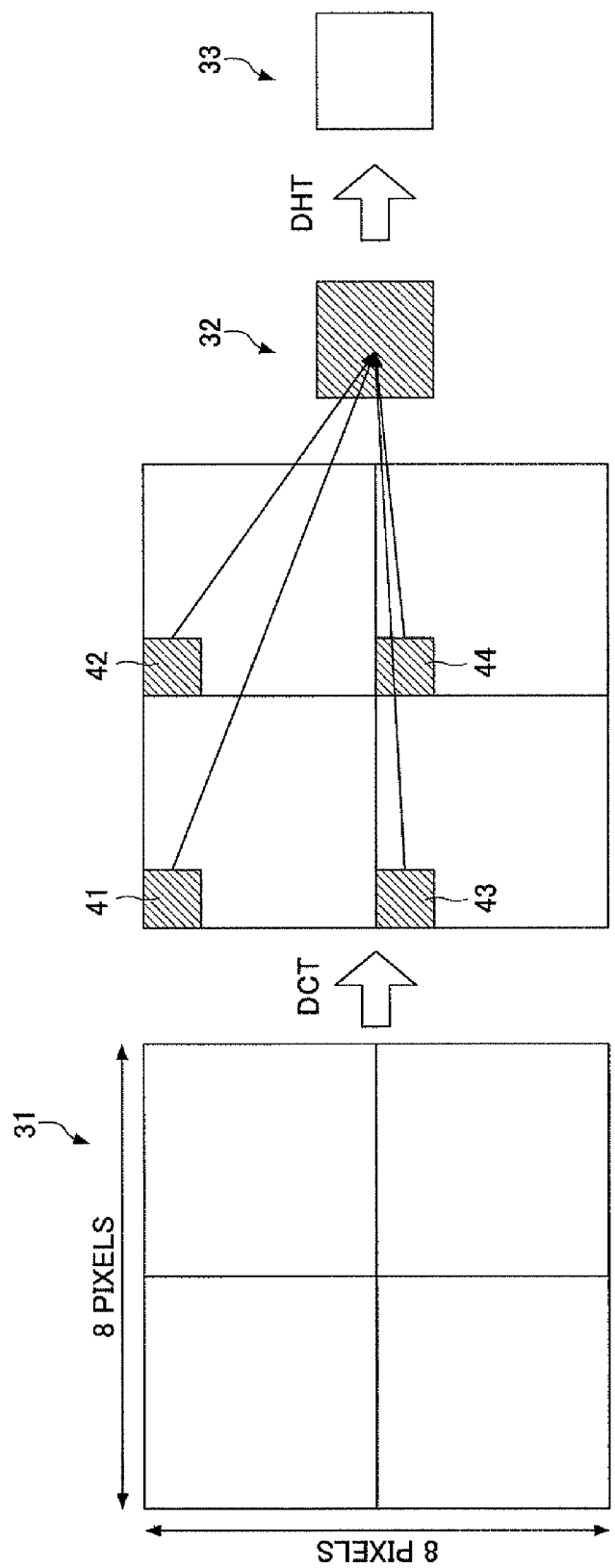
FIG. 4 depicts an example of carrying out color-difference intra on an 8×8-pixel macroblock.
Figure 5:
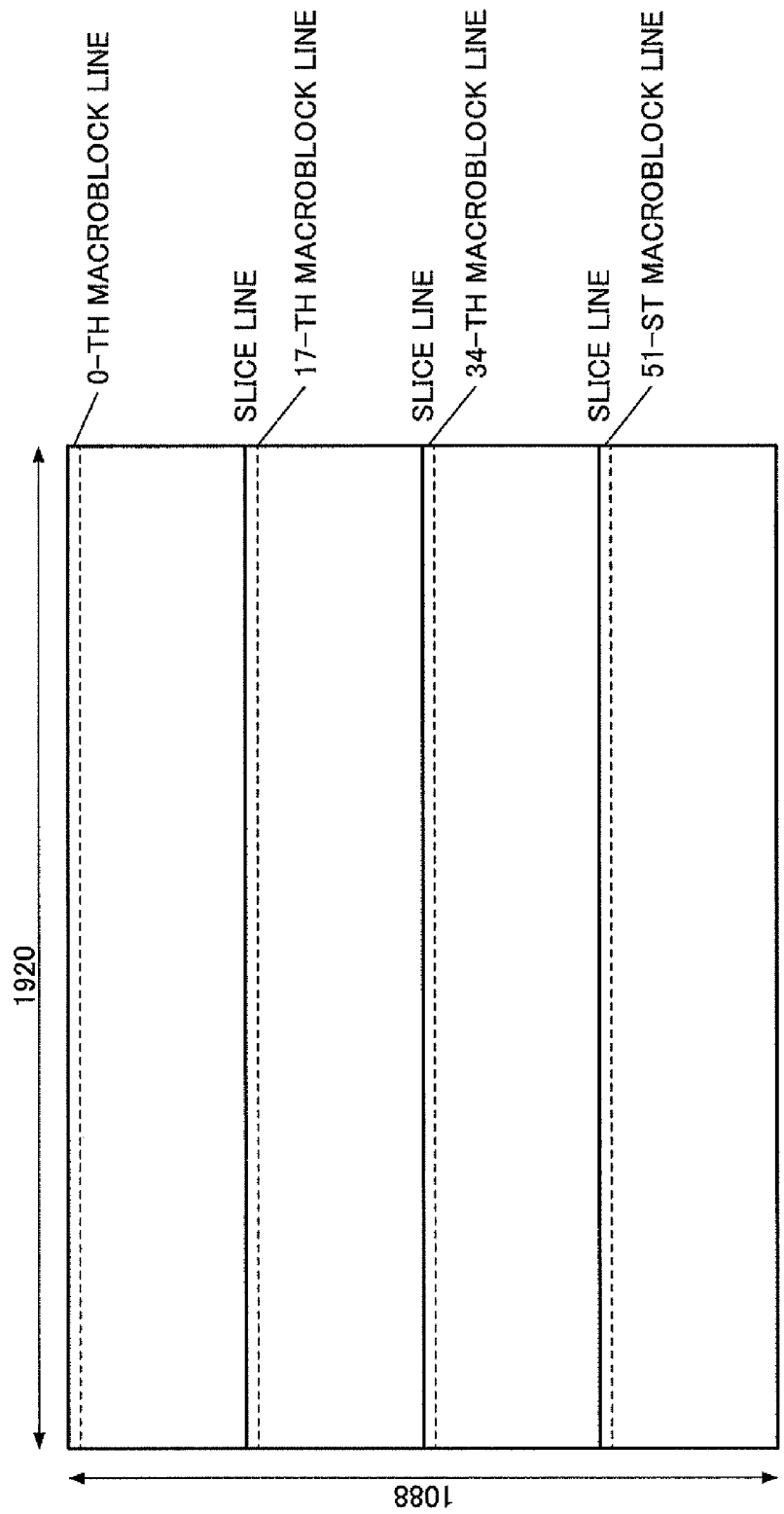
FIG. 5 depicts an example of dividing a 1920×1088 picture into 4 slices.
Figure 6:
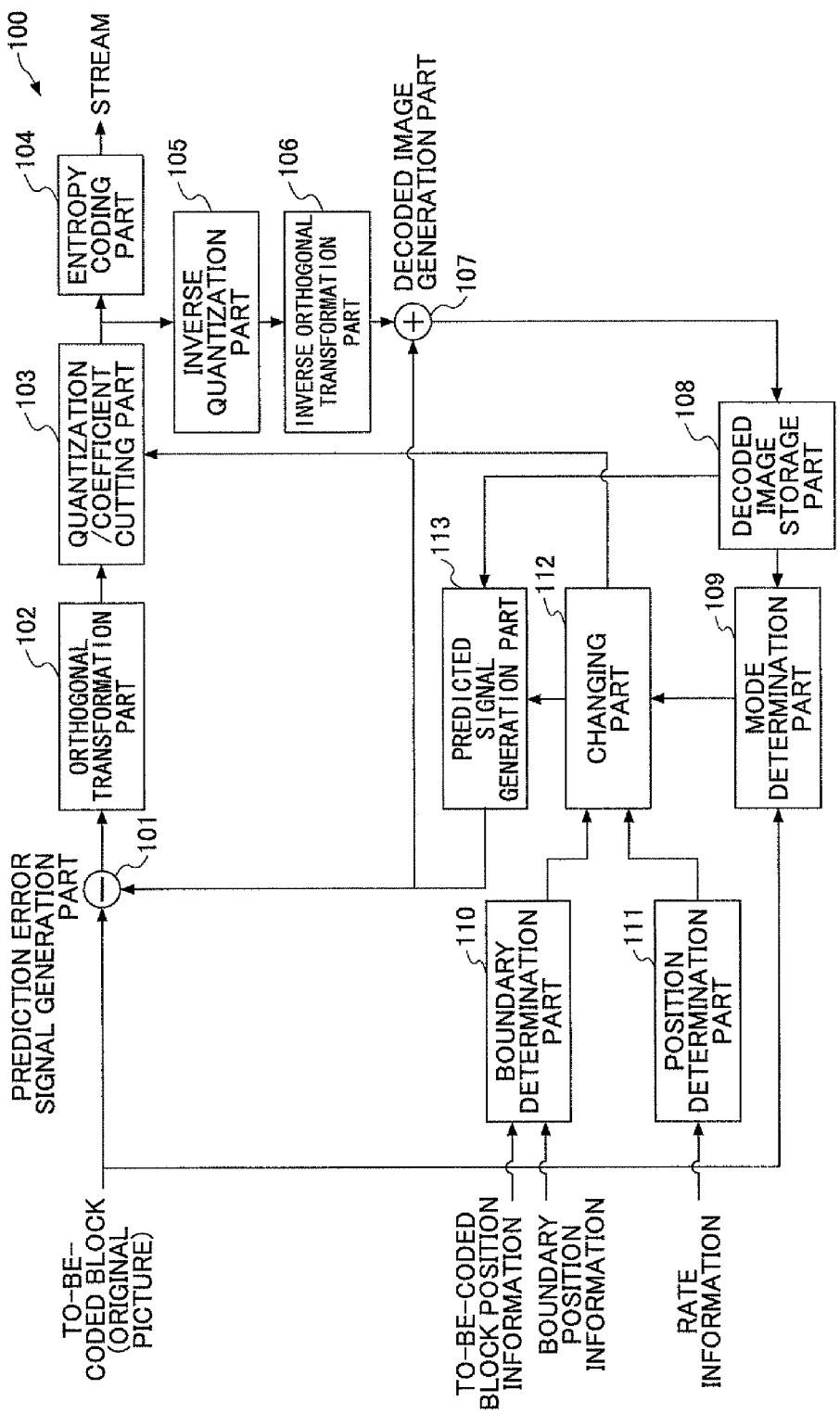
FIG. 6 is a block diagram depicting one example of a configuration of a motion picture coding apparatus according to an embodiment 1 of the present invention.

FIG. 6 is a block diagram depicting one example of a configuration of a motion picture coding apparatus 100 according to an embodiment 1 of the present invention. The motion picture coding apparatus 100 depicted in FIG. 6 includes a prediction error signal generation part 101, an orthogonal transformation part 102, a quantization/coefficient cutting part 103, an entropy coding part 104, an inverse quantization part 105, an inverse orthogonal transformation part 106, a decoded image generation part 107, a decoded image storage part 108, a mode determination part 109, a boundary determination part 110, a position determination part 111, a changing part 112 and a predicted signal generation part 113. Below, functions of the respective parts will be described.

The prediction error signal generation part 101 divides a to-be-coded picture in input image data into 16×16-pixel blocks (macroblocks) and obtains to-be-coded blocks. The prediction error signal generation part 101 generates a prediction error signal using the block data of the to-be-coded blocks and block data of a predicted image that is output from the predicted signal generation part 113. The prediction error signal generation part 101 outputs the generated predication error signal to the orthogonal transformation part 102.

The orthogonal transformation part 102 carries out an orthogonal transformation process on the prediction error signal obtained from the prediction error signal generation part 101. The orthogonal transformation part 102 outputs a frequency signal that includes frequency components of horizontal and vertical directions separated by the orthogonal transformation process to the quantization/coefficient cutting part 103. The frequency signal indicates coefficients after the orthogonal transformation.

The quantization/coefficient cutting part 103 carries out "coefficient cutting" on the frequency signal obtained from the orthogonal transformation part 102, up to a frequency component designated based on a "coefficient cutting position" that is obtained from the changing part 112. "Coefficient cutting" means, as described above, a process to replace a coefficient(s) by "0". The "coefficient cutting position" is a position to be used to determine a coefficient up to which the replacing by "0" is carried out.

The quantization/coefficient cutting part 103 carries out quantization on the frequency signal on which the "coefficient cutting" has been thus carried out, and outputs a signal (quantized signal) that has thus undergone the quantization to the entropy coding part 104 and the inverse quantization part 105. The quantized signal indicates coefficients after undergoing the quantization.

The entropy coding part 104 carries out entropy coding (variable-length coding) on the quantized signal obtained from the quantization/coefficient cutting part 103, and outputs the thus coded signal as a stream. The "entropy coding" means a method of allocating variable-length codes in accordance with frequencies of symbol occurrences.

The inverse quantization part 105 carries out inverse quantization on the quantized signal obtained from the quantization/coefficient cutting part 103. The inverse quantization part 105 outputs the frequency signal that has thus undergone the inverse quantization to the inverse orthogonal transformation part 106.

The inverse orthogonal transformation part 106 carries out an inverse orthogonal transformation process on the frequency signal obtained from the inverse quantization part 105. The inverse orthogonal transformation part 106 outputs the signal that has thus undergone the inverse orthogonal transformation process to the decoded image generation part 107. The inverse quantization part 105 and the inverse orthogonal transformation part 106 thus carry out a decoding process locally. By this decoding process, a signal equal to the prediction error signal before the coding can be obtained.

The decoded image generation part 107 adds together the block data that is the predicted signal obtained from the predicted signal generation part 113 and the prediction error signal obtained from the decoding process carried out by the inverse quantization part 105 and the inverse orthogonal transformation part 106. The decoded image generation part 107 generates block data (a decoded image) predicted for the current to-be-coded picture, through the adding process, and outputs the generated block data to the decoded image storage part 108.

The decoded image storage part 108 stores the block data obtained from the decoded image generation part 107 as new reference picture data. The decoded image storage part 108 outputs the reference picture data as the decoded image(s) to the mode determination part 109 and the predicted signal generation part 113.

The mode determination part 109 determines, for example, in a case of an I-picture, a "block size in intra prediction". A specific method of the determination is a method of calculating the "sums of absolute differences" (SAD) between the blocks of the predicted images obtained in respective coding modes and the to-be-coded block, and selecting the coding mode for which the SAD becomes minimum.

Further, the mode determination part 109 determines intra prediction or inter prediction by comparing with the SAD in inter prediction, for example, in a case of a P-picture or a B-picture, and outputs the determined coding mode to the changing part 112.

The boundary determination part 110 obtains boundary position information and the position information of the to-be-coded block, and determines whether the to-be-coded block is below a certain boundary. The boundary determination part outputs the determination result to the changing part 112.

The boundary position information is information indicating a boundary position of a picture or a slice. The boundary position information of a slice may be set as a result of a user determining at a time of coding how to divide the picture, or may be set based on the number of macroblocks to be included in one slice according to the coding standard.

Further, the boundary determination part 110 may output flag information as the determination result to the changing part 112. The flag information may have a value "1" when the to-be-coded block is below the certain boundary, and a value "0" when the to-be-coded block is not below the certain boundary. Alternatively, the boundary determination part 110 may output position information as the determination result to the changing part 112. The position information may indicate at which position the to-be-coded block is with respect to the certain boundary.

The certain boundary is, for example, a slice boundary or a picture boundary, and indicates such a boundary that referring to the pixel values of a block upward adjacent thereto is not allowed. In a case of the slice boundary, referring to the upward adjacent pixel values across the slice boundary is not allowed according to the coding standard. In a case of the picture boundary, referring to the upward adjacent pixel values is not possible since there are no upward adjacent pixel values.

The position determination part 111 determines whether to carry out "coefficient cutting" in a case of having determined based on rate information that it is not possible to satisfy a designated target rate when using a quantization parameter calculated through rate control. The rate information is determined based on a communication band or the like.

In a case of carrying out "coefficient cutting", the position determination part 111 determines a coefficient cutting position, and outputs information indicating the determined coefficient cutting position (which may also be referred to as "coefficient cutting position information") to the changing part 112.

Based on the determination result obtained from the boundary determination part 110, the coefficient cutting position information obtained from the position determination part 111 and the determined coding mode, the changing part 112 determines whether to change the coding mode and the coefficient cutting position.

Figure 7:
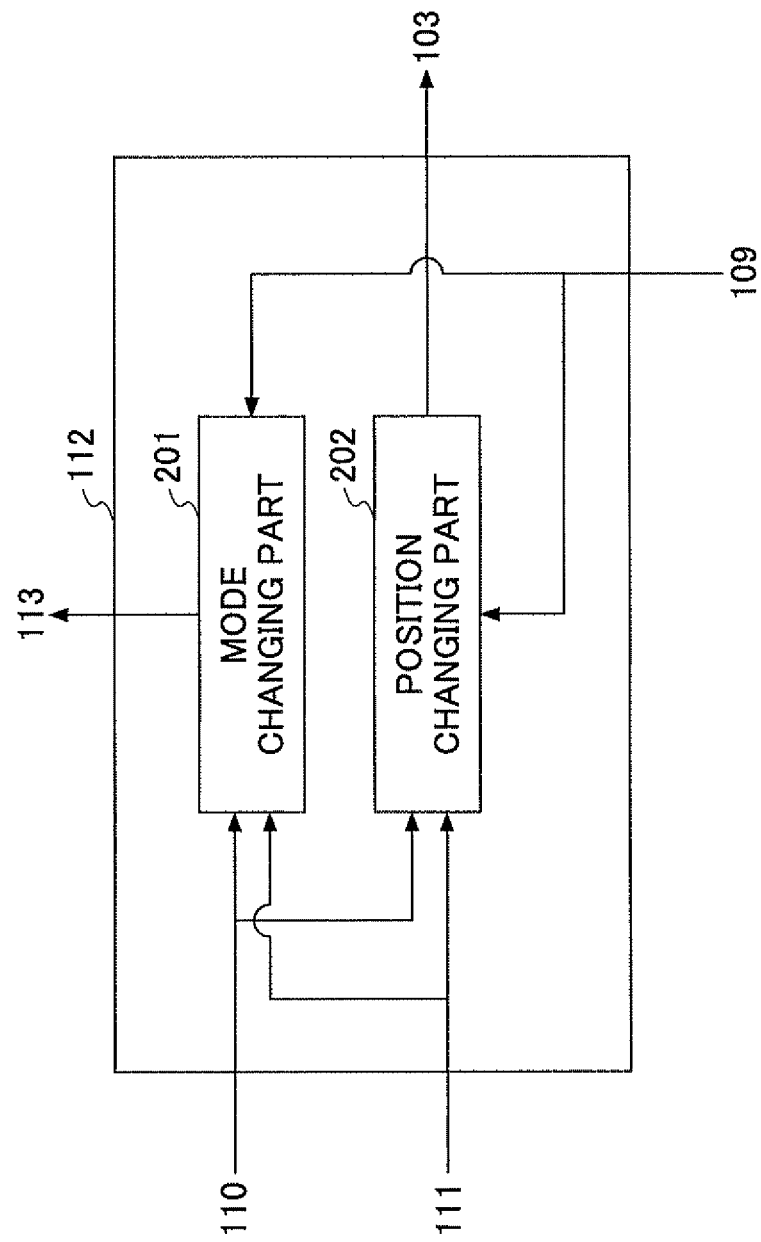
FIG. 7 is a block diagram depicting one example of a configuration of a changing part according to the embodiment 1.

FIG. 7 is a block diagram depicting one example of the changing part 112 according to the embodiment 1. The changing part 112 includes a mode changing part 201 and a position changing part 202.

The mode changing part 201 determines whether to change the coding mode determined by the mode determination part 109, based on the determined coding mode, the determination result information of the boundary determination part 110 (for example, the flag information indicating whether the to-be-coded block is below the certain boundary), and the coefficient cutting position information.

In a case where, for example (referred to as a "condition 1"), the to-be-coded block is below the certain boundary, the determined coding mode is the coding mode of Intra 16×16, and a position of carrying out "coefficient cutting" (the coefficient cutting position) has been set, the mode changing part 201 changes the current coding mode into a certain coding mode. The certain coding mode is, for example, the coding mode of Intra 8×8 or the coding mode of Intra 4×4 other than the current coding mode of Intra 16×16.

The above-mentioned "condition 1" is a condition obtained from the following conditions being combined by logical AND operation.

The to-be-coded block is below the certain boundary.
The determined coding mode is the coding mode of Intra 16×16.
"Coefficient cutting" is to be carried out.

The reason why the coding mode is changed when the condition 1 is satisfied is for the purpose of preventing "coefficient cutting" from being carried out on the block of DC components. The mode changing part 201 outputs the changed coding mode to the predicted signal generation part 113.

In a case of having determined that the condition 1 is not satisfied, the mode changing part 201 outputs the coding mode determined by the mode determination part 109, as it is, to the predicted signal generation part 113.

The position changing part 202 changes the coefficient cutting position based on the flag information indicating whether the to-be-coded block is below the certain boundary, the coefficient cutting position information and the determined coding mode. For example, in a case where the determined coding mode is "color-difference intra", the to-be-coded block is below the certain boundary and "coefficient cutting" is to be carried out, the position changing part 202 changes the coefficient cutting position information so that the amount of "coefficient cutting" on the block of DC components may be reduced.

For example, the position changing part 202 changes the coefficient cutting position information so that the number of coefficients to be replaced by "0" may be reduced. Alternatively, the position changing part 202 may change the coefficient cutting position so that no "coefficient cutting" may be carried out on the block of DC components.

For the block of DC components, the position changing part 202 outputs the thus changed coefficient cutting position information to the quantization/coefficient cutting part 103. For the blocks other than the block of DC components, the position changing part 202, for example, does not change the coefficient cutting position information, and outputs the coefficient cutting position information that has not been changed to the quantization/coefficient cutting part 103.

It is noted that the position changing part 202 may carry out the coefficient cutting position changing on both the luminance signal and the color-difference signal. In a case where the mode changing part 201 does not carry out the above-mentioned mode changing process, the coefficient cutting position changing is carried out on both the luminance signal and the color-difference signal.

On the other hand, in a case where the mode changing part 201 carries out the above-mentioned mode changing process, it is sufficient that the position changing part 202 carries out the coefficient cutting position changing on the color-difference signal since no block of DC components is generated for the luminance signal of a block below the certain boundary (since the coding is to be carried out by the coding mode other than the coding mode of Intra 16×16 as a result of the above-mentioned mode changing process).

FIGS. 8A, 8B, 8C and 8D depict one example of "coefficient cutting" on levels. FIGS. 8A, 8B and 8C depict examples of cases of a position (level 0), a position (level 2) and a position (level 4), respectively. The coefficients filled with half-tone dots are those to be replaced by "0" (to undergo "coefficient cutting"), in FIGS. 8A, 8B and 8C (also the same for FIGS. 9A and 9B described later).

For example, a case will be considered of a block of 4×4 where ordinate axis y=0 through 3 and abscissa axis x=0 through 3, as depicted in FIG. 8D. At this time, each position [x][y] will be expressed by x+y. Then, as depicted in FIG. 8D, the top-left position is expressed by "0" (=0+0) and the bottom-right position is expressed by "6" (=3+3), for example.

It will be assumed that a level indicating a "coefficient cutting position" will be denoted by N (0 through 4) and a frequency signal at a position [x][y] will be denoted by a frequency signal [x][y]. The quantization/coefficient cutting part 103 carries out "coefficient cutting" as follows when having obtained the level N as the coefficient cutting position information.

When N=1, the frequency signal [x][y] at the position where x+y=6 is replaced by "0".

When N=2, the frequency signals [x][y] at the respective positions where x+y=5 through 6 are replaced by "0" (see FIG. 8B).

When N=3, the frequency signals [x][y] at the respective positions where x+y=4 through 6 are replaced by "0".

When N=4, the frequency signals [x][y] at the respective positions where x+y=3 through 6 are replaced by "0" (see FIG. 8C).

When N=0, no "coefficient cutting" is carried out (see FIG. 8A).

FIGS. 9A and 9B depict one example of the coefficient cutting position changing. In the example depicted in FIGS. 9A and 9B, the position changing part 202 changes the coefficient cutting position from the level 4 to the level 2 for a block of DC components 51 depicted in FIG. 9A. A block of DC components 52 depicted in FIG. 9B is a block after undergoing the coefficient cutting position changing. As depicted in FIGS. 9A and 9B, the position changing part 202 can reduce the number of coefficients to be replaced by "0" for the coefficients of DC components.

Returning to FIG. 6, the predicted signal generation part 113 generates a predicted signal based on the coding mode obtained from the changing part 112 and the decoded image(s) obtained from the decoded image storage part 108. The predicted signal generation part 113 outputs the generated predicted signal to the prediction error generation part 101 and the decoded image generation part 107.

Thereby, it is possible to reduce the number of DC components on which "coefficient cutting" is carried out, for the block for which referring to the pixel values of the upward adjacent block is not allowed. Thus, it is possible to improve image quality. Therefore, at the certain boundary, it is possible to reduce line-shaped noises even at a time of such low rate control that "coefficient cutting" is to be carried out.

<Operations>

Next, operations of the motion picture coding apparatus 100 according to the embodiment 1 of the present invention will be described. FIG. 10 is a flowchart depicting one example of a coding process according to the embodiment 1. A process depicted in FIG. 10 is a coding process to be carried out for each block.

In step S101, the boundary determination part 110 determines a position of a to-be-coded block with respect to a certain boundary based on boundary position information and position information of the to-be-coded block, and outputs a determination result to the changing part 112. The determination result is flag information indicating whether the to-be-coded block is a block below the certain boundary, or the like.

Further, the position determination part 111 determines a coefficient cutting position from rate information, and outputs the coefficient cutting position information to the changing part 112. For example, the position determination part 111 determines whether to carry out "coefficient cutting" in a case of having determined that it is not possible to satisfy a designated target rate by a quantization parameter calculated through rate control.

The position determination part 111 may use as a determination reference the number of times of successive occurrences of the maximum value of the quantization parameter of the standard with respect to a threshold at a time the quantization parameter becomes the maximum value. As a specific example, the number of times of successive occurrences of the maximum value of the quantization parameter is denoted by QP_COUNT, and a parameter for determining the coefficient cutting position is denoted by QP_TH. In this case, the position determination part 111 may obtain the coefficient cutting position by the following formula (1):

$$\text{``COEFFICIENT CUTTING POSITION''} = QP\_COUNT / QP\_TH \qquad (1)$$

As specific values of QP_COUNT and QP_TH, suitable values are set by an experiment or the like.

As another method, the position determination part 111 may determine the coefficient cutting position by accumulating the information amounts of the already coded macroblocks, and determining how much a threshold for the target rate per 1 macroblock is exceeded. For example, the position determination part 111 may determine the coefficient cutting position by the following formulas (2) and (3).

$$\text{``AVERAGE OF INFORMATION AMOUNTS OF MACROBLOCKS''} = \text{``ACCUMULATED INFORMATION AMOUNT OF MACROBLOCKS''} / \text{``NUMBER OF ACCUMULATED MACROBLOCKS''} \qquad (2)$$

$$\text{``COEFFICIENT CUTTING POSITION''} = \alpha \times \text{``AVERAGE OF INFORMATION AMOUNTS OF MACROBLOCKS''} / \text{``TARGET RATE PER 1 MACROBLOCK''} \qquad (3)$$

$\alpha$ denotes a coefficient for adjustment, and a suitable value thereof is set by an experiment or the like.

Basically, the position determination part 111 determines the coefficient cutting position in such a manner that "coefficient cutting" is carried out gradually from the highest frequency component. For example, the position determination part 111 may use the coefficient cutting position expressed by the level N described above using FIGS. 8A, 8B, 8C, 8D, 9A and 9B, for example. In this example, as depicted in FIGS.

8A, 8B and 8C, the larger the coefficient cutting position becomes, the larger the number of coefficients replaced by "0" becomes.

In step S102, the mode determination part 109 determines, for example, for an I-picture, a block size in intra prediction. The mode determination part 109 may calculate the sums of absolute differences (SAD) between the blocks of the predicted images obtained in the respective coding modes and the to-be-coded block, and select the coding mode for which the SAD becomes minimum.

Further, in a case of a P-picture or a B-picture, the mode determination part 109 carries out comparison with the SAD in inter prediction, and determines whether to use intra prediction or inter prediction. The mode determination part 109 outputs the determined coding mode to the changing part 112. In this case, SAD values in the respective coding modes are expressed as follows:

SAD 8×8: a SAD value in Intra 8×8
SAD 4×4: a SAD value in Intra 4×4
SAD 16×16: a SAD value in Intra 16×16
SAD inter: a SAD value in inter prediction Then, in this case, the mode determination part 109 obtains Min(SAD inter, Min(SAD 16×16, Min(SAD 8×8, SAD 4×4)))

The mode determination part 109 then, in this case, selects the coding mode corresponding to the Min(SAD inter, Min(SAD 16×16, Min(SAD 8×8, SAD 4×4))). It is noted that "Min(A, B)" means the minimum one of the respective values of A and B.

In step S103, the changing part 112 determines whether to change the coding mode, from the position information obtained from the boundary determination part 110, the determined coding mode and the coefficient cutting position information. The changing part 112 outputs the coding mode determined based on the determination result to the predicted signal generation part 113.

The changing part 112 determines whether to change the coefficient cutting position, from the position information obtained from the boundary determination part 110, the coding mode that the changing part 112 has thus determined and the coefficient cutting position information. The changing part 112 outputs the coefficient cutting position information that has been changed or not changed according to the determination to the quantization/coefficient cutting part 103. Details of the step S103 will be described later.

In step S104, the predicted signal generation part 113 generates the predicted signal based on the coding mode that has been changed or not changed according to the determination by the changing part 112 and the decoded image(s). The predicted signal generation part 113 outputs the generated predicted signal to the prediction error signal generation part 101.

The prediction error signal generation part 101 calculates a difference between the to-be-coded block (original image) and the predicted signal, and generates the prediction error signal. The generated prediction signal undergoes orthogonal transformation by the orthogonal transformation part 102, and thus becomes the frequency signal.

In step S105, the quantization/coefficient cutting part 103 carries out "coefficient cutting" on the frequency signal (coefficients) after undergoing orthogonal transformation or after undergoing quantization, using the coefficient cutting position information (that has been changed or not changed according to the determination by the changing part 112) as a threshold. The quantization/coefficient cutting part 103 carries out "coefficient cutting" on the frequency signal after orthogonal transformation, for example.

The quantization/coefficient cutting part 103 obtains a level of "coefficient cutting" indicated by the coefficient cutting position information, and carries out "coefficient cutting" according to the obtained level. For example, the quantization/coefficient cutting part 103 carries out "coefficient cutting" according to the level N indicated by the coefficient cutting position information, as depicted in FIGS. 8A, 8B, 8C and 8D.

The quantization/coefficient cutting part 103 carries out quantization using a predetermined quantization step size Q (corresponding to the above-mentioned quantization parameter) on the frequency signal that has undergone orthogonal transformation and "coefficient cutting". Alternatively, the quantization/coefficient cutting part 103 may carry out quantization on the frequency signal that has undergone orthogonal transformation and then, carry out "coefficient cutting" on the signal that has thus undergone quantization.

In step S106, the entropy coding part 104 carries out entropy coding (variable-length coding) on the quantized signal obtained from the quantization/coefficient cutting part 103, and outputs the coded signal as a stream.

In step S107, the inverse quantization part 105, the inverse orthogonal transformation part 106 and the decoded image generation part 107 generate a decoded image.

Specifically, the inverse quantization part 105 carries out inverse quantization on the quantized signal obtained from the quantization/coefficient cutting part 103. The inverse quantization part 105 outputs the frequency signal that has undergone the inverse quantization to the inverse orthogonal transformation part 106.

The inverse orthogonal transformation part 106 generates a prediction error signal obtained from the decoding process being carried out as a result of inverse transformation of orthogonal transformation being carried out, and outputs the prediction error signal to the decoded image generation part 107.

The decoded image generation part 107 adds together block data that is a predicted signal obtained from the predicted signal generation part 113 and the prediction error signal that has undergone the decoding process carried out by the inverse quantization part 105 and the inverse orthogonal transformation part 106, and generates the decoded image.

The image data of the block data that has undergone the decoding process is stored in the decoded image storage part 108. The decoded image storage part 108 stores the locally decoded block data (decoded image) as new reference picture data, and outputs it to the mode determination part 109 and the predicted signal generation part 113.

(Changing Process)

Next, the changing process in step S103 will be described. FIG. 11 is a flowchart depicting one example of the changing process according to the embodiment 1. In step S201 of FIG. 11, the boundary determination part 110 determines whether a to-be-coded block is a block that is below a certain boundary. When the to-be-coded block is below the certain boundary (step S201 YES), the process proceeds to step S202. When the to-be-coded block is not below the certain boundary (step S201 NO), the changing process is not to be carried out.

The certain boundary indicates a boundary such that referring to pixel values of a block upward adjacent thereto is not allowed, and, for example, is a picture boundary or a slice boundary.

In step S202, the mode changing part 201 carries out a coding mode changing process including determination as to whether to change the determined coding mode, based on the determined coding mode, the determination result of the boundary determination part 110 and the coefficient cutting position information. Details of the coding mode changing process will be described later.

In step S203, the position changing part 202 carries out a coefficient cutting position changing process including determination as to whether to change the coefficient cutting position information, based on the coefficient cutting position information, the determined coding mode and the determination result of the boundary determination part 110. Details of the coefficient cutting position changing process will be described later.

Thereby, it is possible to carry out the coding mode changing process and the coefficient cutting position changing process on the block that is below the certain boundary, for example, the picture boundary or the slice boundary.

(Coding Mode Changing Process)

Figure 12:
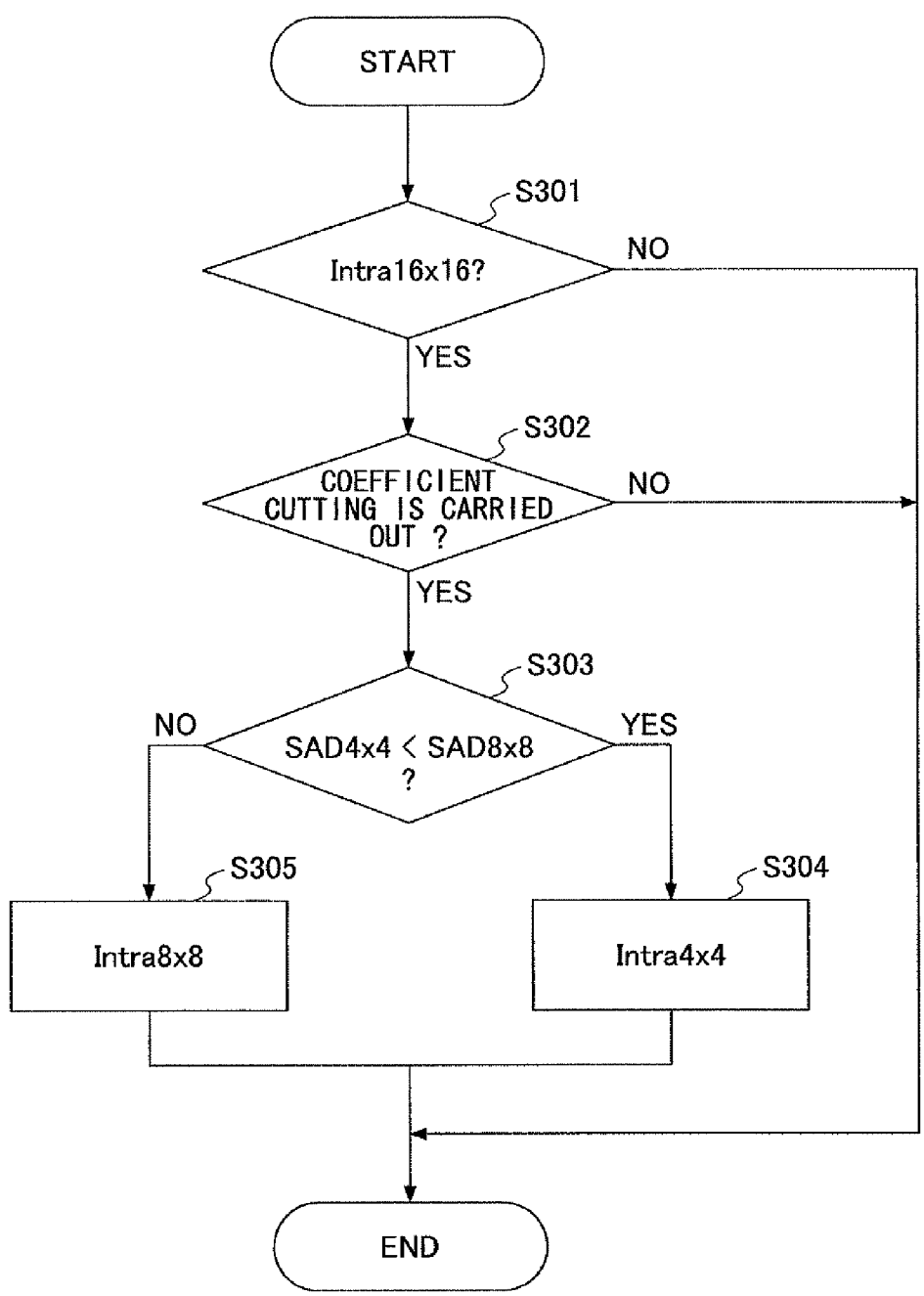
FIGS. 12 and 13 are flowcharts depicting examples of a coding mode changing process according to the embodiment 1.

Next, the coding mode changing process will be described. FIG. 12 is a flowchart depicting an example of the coding mode changing process according to the embodiment 1. In step S301 of FIG. 12, the mode changing part 201 determines whether the current coding mode is the coding mode of Intra 16×16. When the current coding mode is the coding mode of Intra 16×16 (step S301 YES), the process proceeds to step S302. When the current coding mode is not the coding mode of Intra 16×16 (step S301 NO), the current coding mode is not changed.

In step S302, the mode changing part 201 determines whether "coefficient cutting" is to be carried out, based on the coefficient cutting position information. When "coefficient cutting" is to be carried out (step S302 YES), the process proceeds to step S303. When "coefficient cutting" is not to be carried out (step S302 NO), the current coding mode is not changed.

In step S303, the mode changing part 201 obtains the coding modes that have been used when the coding mode has determined by the mode determination part 109, compares SAD 4×4 (i.e., SAD in Intra 4×4) with SAD 8×8 (i.e., SAD in Intra 8×8), and determines whether SAD 4×4 is smaller.

When SAD 4×4 is smaller (step S303 YES), the process proceeds to step S304. When SAD 4×4 is greater than or equal to SAD 8×8 (step S303 NO), the process proceeds to step S305.

In step S304, the mode changing part 201 changes the current coding mode to Intra 4×4.

In step S305, the mode changing part 201 changes the current coding mode to Intra 8×8. It is noted that step S302 may be omitted.

Thereby, it is possible to prevent the coding mode of Intra 16×16, in which the block of DC components is generated, from being selected for the block that is below the certain boundary.

Figure 13:
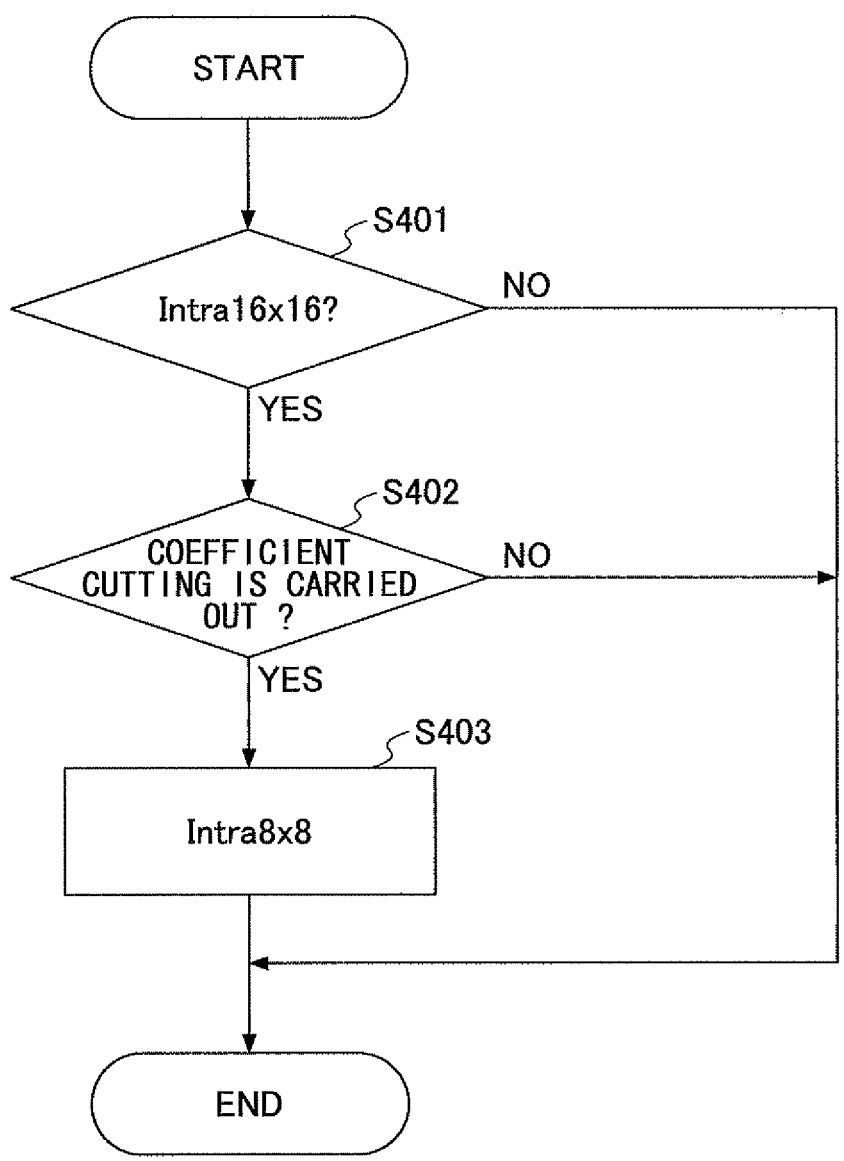

FIG. 13 is a flowchart depicting another example of the coding mode changing process according to the embodiment 1. Steps S401 and S402 are the same as or similar to steps S301 and S302 of FIG. 12, and therefore, duplicate description therefor will be omitted.

When the determination result of step S402 is YES, the mode changing part 201 changes the current coding mode to the coding mode of Intra 8×8. It is noted that step S402 may be omitted.

This is because since the pixel values included in the block are estimated to be flat in the case of Intra 16×16, it is presumed that higher efficiency is obtained by Intra 8×8 than Intra 4×4. Thus, it is possible to omit a process of obtaining the coding costs and determining the coding mode.

(Coefficient Cutting Position Changing Process)

Figure 14:
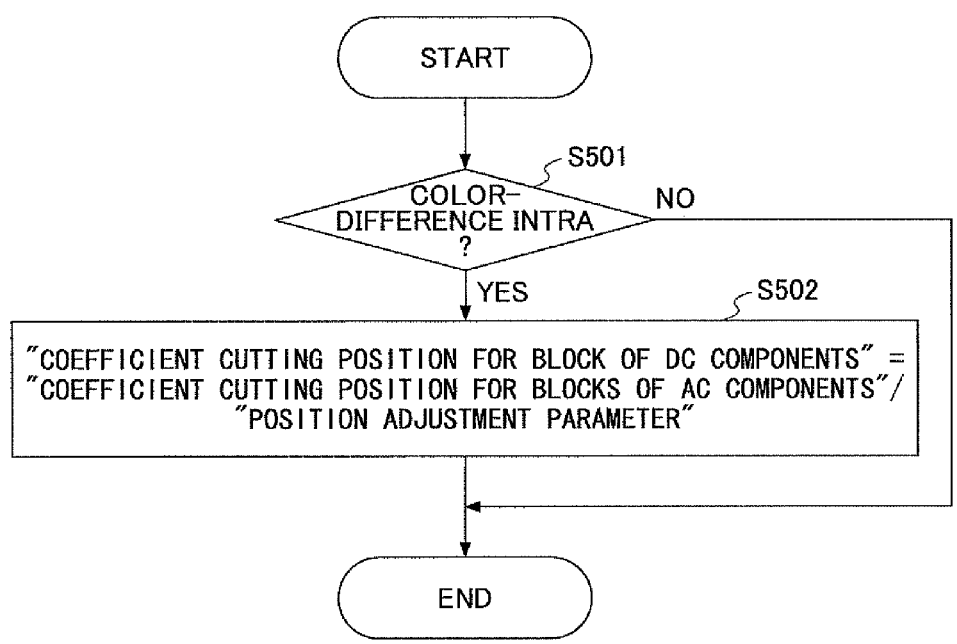
FIGS. 14 and 15 are flowcharts depicting examples of a coefficient cutting position changing process according to the embodiment 1.

Next, the coefficient cutting position changing process will be described. FIG. 14 is a flowchart depicting an example of the coefficient cutting position changing process according to the embodiment 1. In step S501 of FIG. 14, the position changing part 202 determines whether the current coding mode is color-difference intra. That is, the position changing part 202 determines whether the current coding mode is intra prediction for the color-difference signal.

When the current coding mode is color-difference intra (step S501 YES), the process proceeds to step S502. When the current coding mode is not color-difference intra (step S501 NO), the coefficient cutting position is not to be changed.

In step S502, since there is no room to change the coding mode as the current coding mode is color-difference intra, the position changing part 202 changes the coefficient cutting position. At this time, the position changing part 202 changes the coefficient cutting positions separately for the block of DC components and the blocks of AC components, respectively.

As to the coefficient cutting position information for the blocks of AC components, the position changing part 202 outputs the coefficient cutting position, determined by the position determination part 111, as it is, to the quantization/coefficient cutting part 103. As to the coefficient cutting position information for the block of DC components, the position changing part 202 selects a coefficient cutting position such that the coefficient cutting position for the blocks of AC components becomes greater than or equal to ($\geq$) the coefficient cutting position for the block of DC components. It is noted that as mentioned above, the larger the coefficient cutting position becomes, the larger the number of coefficients replaced by "0" becomes.

Therefore, the position changing part 202 changes the coefficient cutting position for the block of DC components such as to satisfy the following formula (4):

"COEFFICIENT CUTTING POSITION FOR BLOCK OF DC COMPONENTS"="COEFFICIENT CUTTING POSITION FOR BLOCKS OF AC COMPONENTS"/"POSITION ADJUSTMENT PARAMETER" (4)

For the "position adjustment parameter", a suitable value (for example, "2") greater than "1" is set by an experiment or the like.

Figure 15:
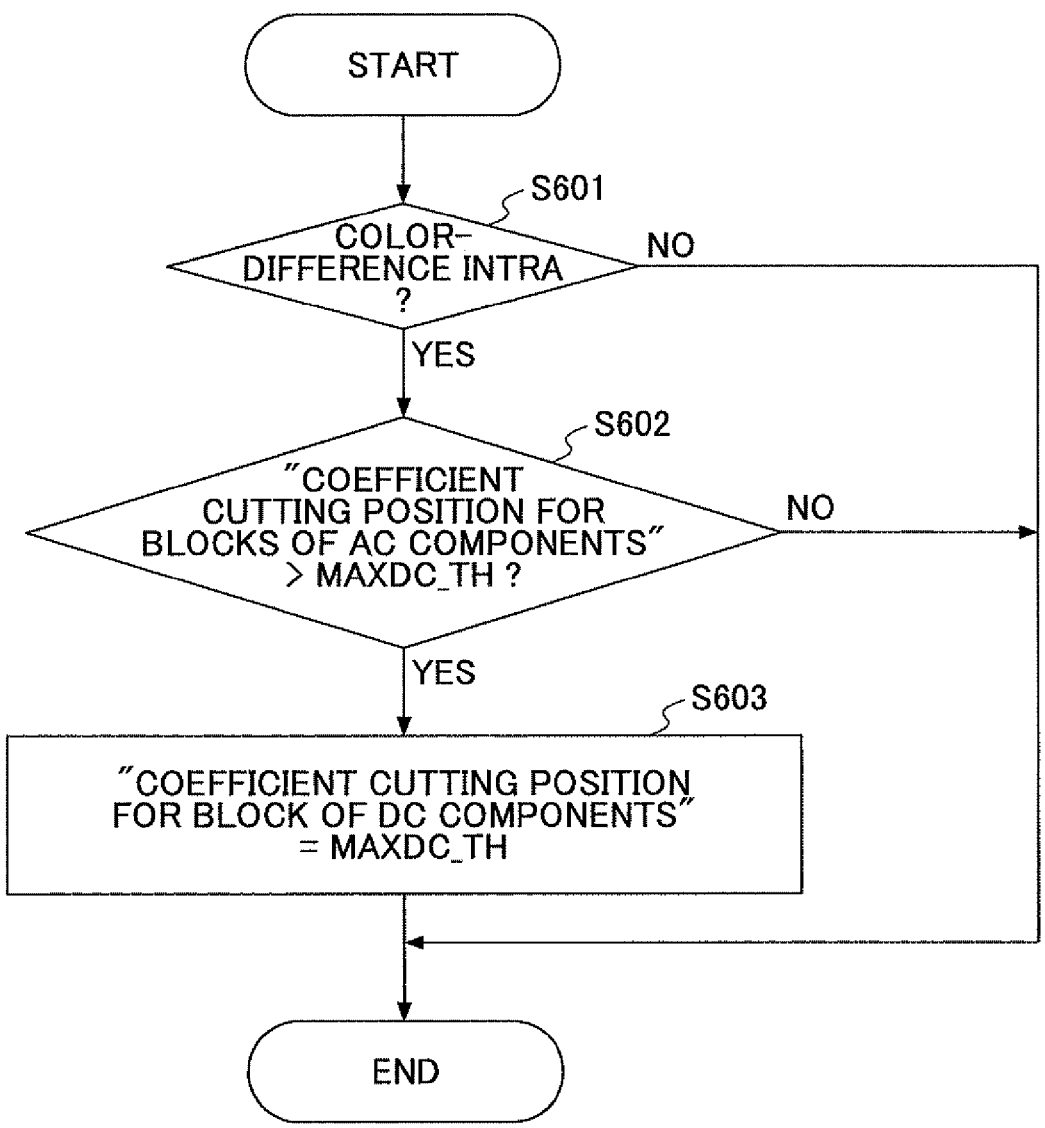

FIG. 15 is a flowchart depicting another example of the coefficient cutting position changing process according to the embodiment 1. Step S601 of FIG. 15 is the same as or similar to step S501 of FIG. 14, and therefore, duplicate description therefor will be omitted.

In step S602, the position changing part 202 previously sets the maximum value MAXDC_TH (threshold) for the coefficient cutting position for the block of DC components. The position changing part 202 determines whether the coefficient cutting position for the blocks of AC components is greater than the threshold MAXDC_TH. When this condition is satisfied (step S602 YES), the process proceeds to step S603. When this condition is not satisfied (step S602 NO), the coefficient cutting position is not to be changed.

In step S603, the position changing part 202 changes the coefficient cutting position for the block of DC components to the threshold MAXDC_TH. Summarizing steps S602 and S603, the position changing part 202 obtains the coefficient cutting position for the block of DC components by the following formula (5):

"COEFFICIENT CUTTING POSITION FOR BLOCK OF DC COMPONENTS"=MIN (MAX$DC\_TH$, "COEFFICIENT CUTTING POSITION FOR BLOCKS OF AC COMPONENTS") (5)

Further, other than the above-described methods of FIGS. 14 and 15, the position changing part 202 may carry out such an operation that none of the DC components is to be cut. None of the DC component is to be cut means none of the coefficients is to be replaced by "0". By these methods, as depicted in FIGS. 9A and 9B, the coefficient cutting position for the DC components is changed so that the number of coefficients replaced by "0" is reduced. It is noted further that, alternatively, the position changing part 202 may increase the number of coefficients to be replaced by "0" for the AC components to make up for not carrying out "coefficient cutting" for the DC components as mentioned above.

It is noted that on the macroblock line below the certain boundary, the information amount becomes larger in comparison to the normal "coefficient cutting" manner as a result of the number of coefficients replaced by "0" being reduced by the above-mentioned methods according to the embodiment 1. However, it is possible to control the entire information amount as a result of the level N of the coefficient cutting position determined by the position determination part 111 for the next macroblock line(s) being increased.

Thus, according to the embodiment 1, it is possible to improve image quality in the block for which referring to the pixel values of the upward adjacent block is not allowed. Thereby, it is possible to reduce line-shape noises on pictures or slice boundaries even at a time of such low rate control that "coefficient cutting" is carried out.

Embodiment 2

Next, a motion picture coding apparatus 300 according to an embodiment 2 of the present invention will be described. According to the embodiment 2, when a coding mode to be used is determined, in a case where the to-be-coded block is below a certain boundary, a coding mode other than a coding mode(s) of separating into respective blocks of DC components and AC components is determined to be used.
<Configuration>

Figure 16:
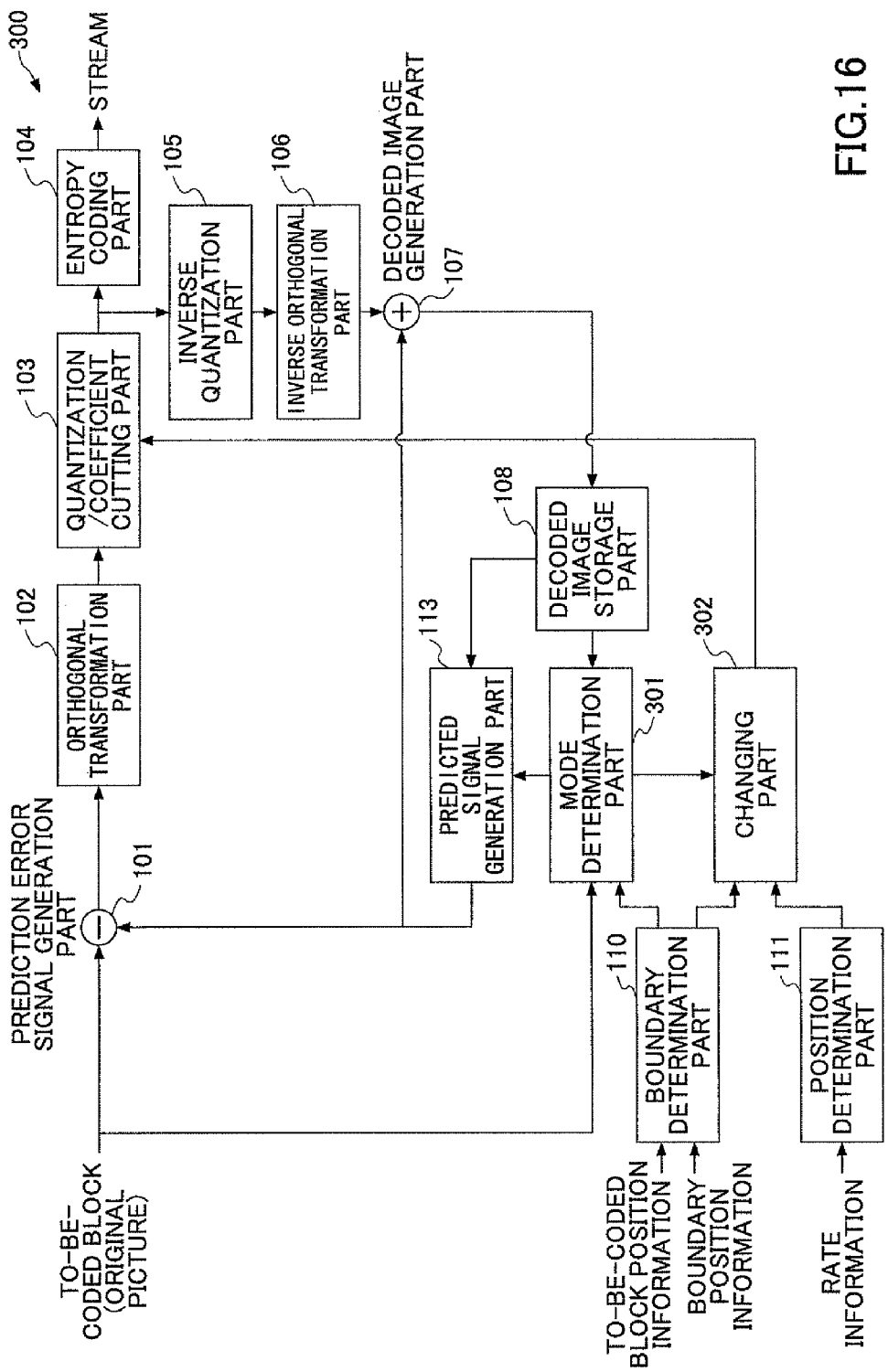
FIG. 16 is a block diagram depicting one example of a configuration of a motion picture coding apparatus according to an embodiment 2 of the present invention.

FIG. 16 is a block diagram depicting one example of a configuration of the motion picture coding apparatus 300 according to the embodiment 2. In the configuration of FIG. 16, the same reference numerals are given to parts the same as or similar to those depicted in FIG. 6, and duplicate description therefor will be omitted.

A mode determination part 301 determines a coding mode to be used based on the block data of the to-be-coded block, picture information (indicating that the to-be-coded block is of an I-picture, a P-picture or a B-picture), the decoded image(s) and the position information obtained by the boundary determination part 110. The mode determination part 301 selects and determines to use a coding mode other than a coding mode(s) in which the to-be-coded block is separated into the block of DC components and the blocks of AC components when orthogonal transformation is carried out, in a case where, for example, the to-be-coded block is of an I-picture and is a block below the certain boundary.

In this case, assuming H.264/AVC as an example, the mode determination part 301 determines to use a coding mode other than the intra coding mode of 16×16 size (Intra 16×16). The coding modes other than Intra 16×16 include, for example, the intra coding mode of 8×8 size (Intra 8×8) and the intra coding mode of 4×4 size (Intra 4×4).

For the respective coding modes of Intra 8×8 and Intra 4×4, the mode determination part 301 compares the sums of absolute differences (SAD) between the to-be-coded block and the predicted images with one another, and determines to use the coding mode having the smaller SAD. The mode determination part 301 outputs the determined coding mode to the predicted signal generation part 113 and a changing part 302.

The changing part 302 carries out a coefficient cutting position changing process, based on the position information obtained from the boundary determination part 110, the determined coding mode and the coefficient cutting position information. The coefficient cutting position changing process of the changing part 302 is the same as or similar to the coefficient cutting position changing process of the position changing part 202 according to the embodiment 1 described above.

Thereby, narrowing down the coding modes and determining the coding mode to be used carried out by the mode determination part 301 is made easier, and therefore, the information processing amount can be reduced. Further, since the coding is carried out using the coding mode determined by the mode determination part 301, the changing part 302 does not need to carry out a coding mode changing process such as the coding mode changing process of step S202 of FIG. 11 of the embodiment 1 described above, and therefore, the information processing amount can be reduced.
<Operations>

Figure 17:
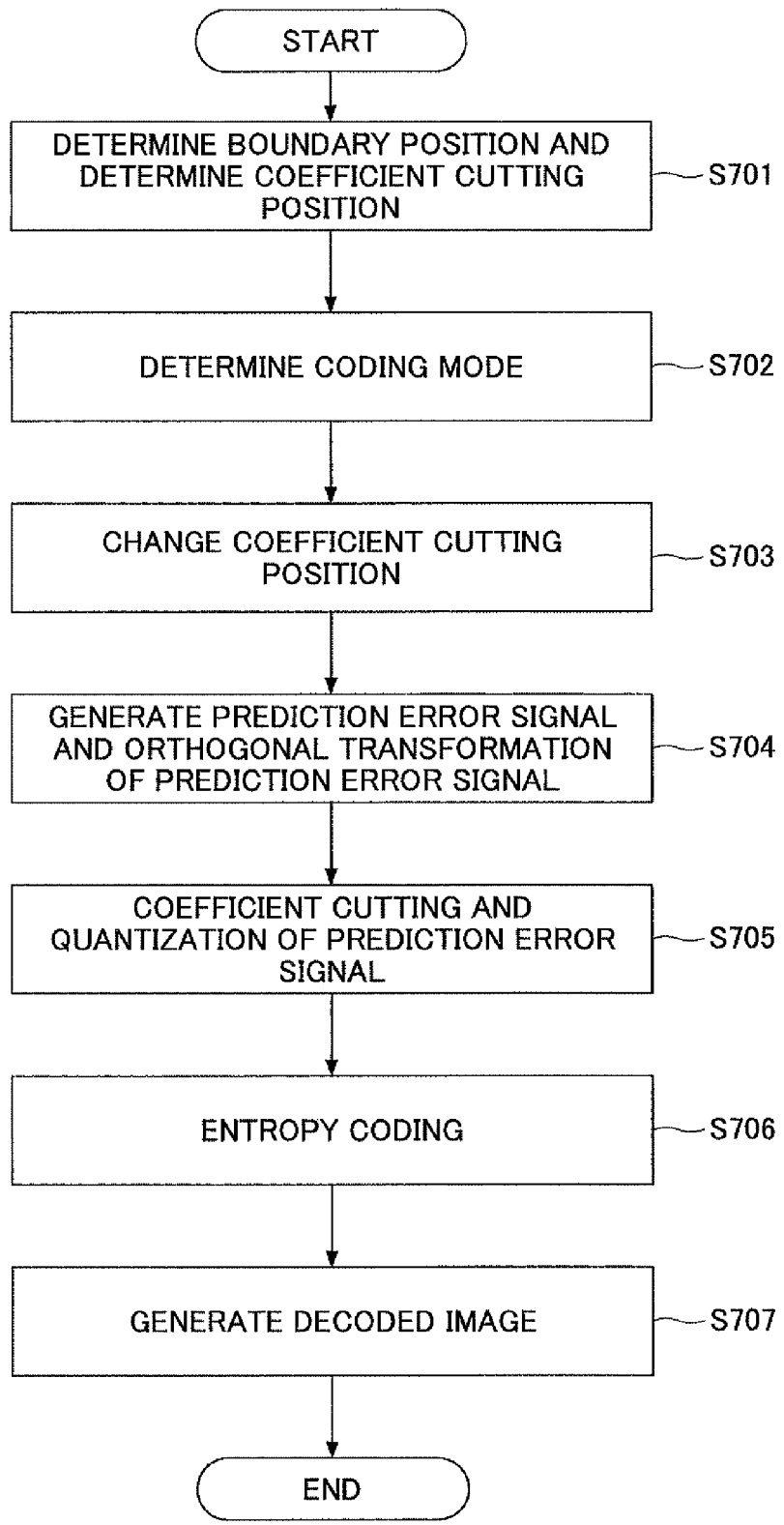
FIG. 17 is a flowchart depicting one example of the coding process according to the embodiment 2.

Next, operations of the motion picture coding apparatus 300 according to the embodiment 2 will be described. FIG. 17 is a flowchart depicting one example of a coding process according to the embodiment 2. Step S701 is the same as or similar to step S101 of FIG. 10.

In step S702, the mode determination part 301 determines, for example, for an I-picture, a block size in intra prediction. The mode determination part 301 selects a coding mode other than the coding mode(s) of separating into the blocks of AC components and the block of DC components for carrying out the coding, in a case where the position of the to-be-coded block is below the certain boundary. For this purpose, the mode determination part 301 calculates the sums of absolute differences (SAD) between the blocks of the predicted images obtained in the respective coding modes and the to-be-coded block, and selects the coding mode having the smallest SAD.

Further, in a case of a P-picture or a B-picture, the mode determination part 301 carries out comparison with the SAD in inter prediction, and determines whether to use intra prediction or inter prediction. At this time, the mode determination part 301 determines to use, for example, a coding mode other than Intra 16×16, in a case where the to-be-coded block is below the certain boundary. Details of this coding mode determination process of the mode determination part 301 will be described later using FIG. 18. The mode determination part 301 outputs the determined coding mode to the changing part 302 and the predicted signal generation part 113.

In step S703, the changing part 302 carries out the coefficient cutting position changing process depicted in FIG. 14 or FIG. 15.

Step S704 and the subsequent steps are the same as or similar to step S104 and the subsequent steps of FIG. 10, and therefore, duplicate description therefor will be omitted.
(Coding Mode Determination Process)

Figure 18:
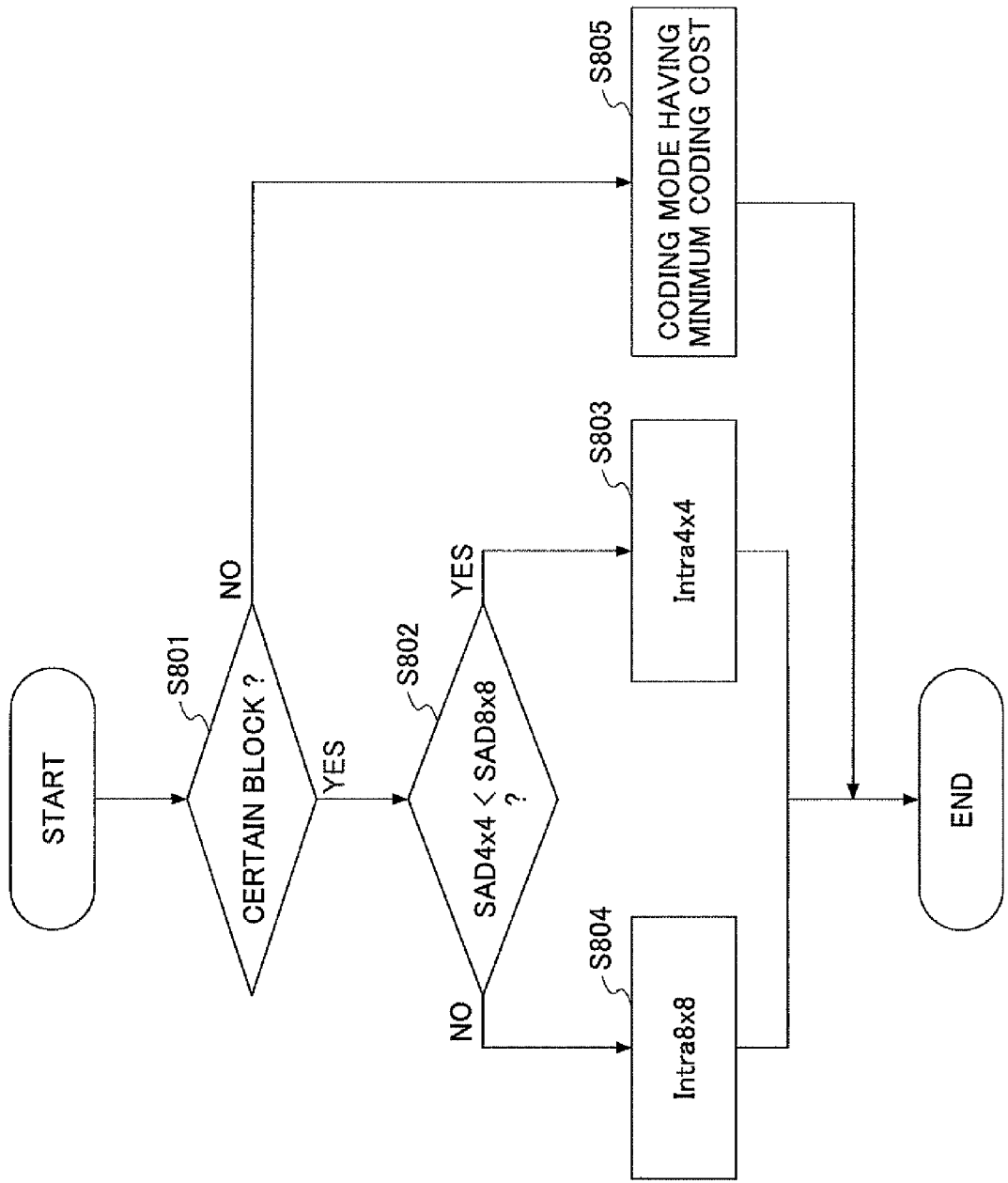
FIG. 18 is a flowchart depicting one example of a mode determination process carried out by a mode determination part according to the embodiment 2.

Next, the coding mode determination process carried out by the mode determination part 301 will be described. FIG. 18 is a flowchart depicting one example of the coding mode determination process carried out by the mode determination part 301 according to the embodiment 2.

In step S801, the mode determination part 301 determines whether the to-be-coded block is a block (also referred to as a certain block, hereinafter) below the certain boundary. When the to-be-coded block is the certain block (step S801 YES), the process proceeds to step S802. When the to-be-coded block is not the certain block (step S801 NO), the process proceeds to step S805.

Steps S802 through S804 are the same as or similar to steps S303 through S305 of FIG. 12, and therefore, duplicate description therefor will be omitted.

In step S805, the mode determination part 301 determines the coding mode that has the minimum one of the coding costs calculated for the respective coding modes.

Thereby, the mode(s) of separating into AC components and DC components for carrying out the coding is not selected for the macroblock that is below the picture boundary or the slice boundary. Therefore, cases where "coefficient cutting" is carried out on DC components are reduced, and it is possible to improve image quality even at a low rate control.

It is noted that in the above-mentioned embodiments 1 and 2, it is also possible that the above-described changing process is carried out only for I-pictures, and/or it is also possible that the above-described changing process is not carried out only for B-pictures.

Embodiment 3

Figure 19:
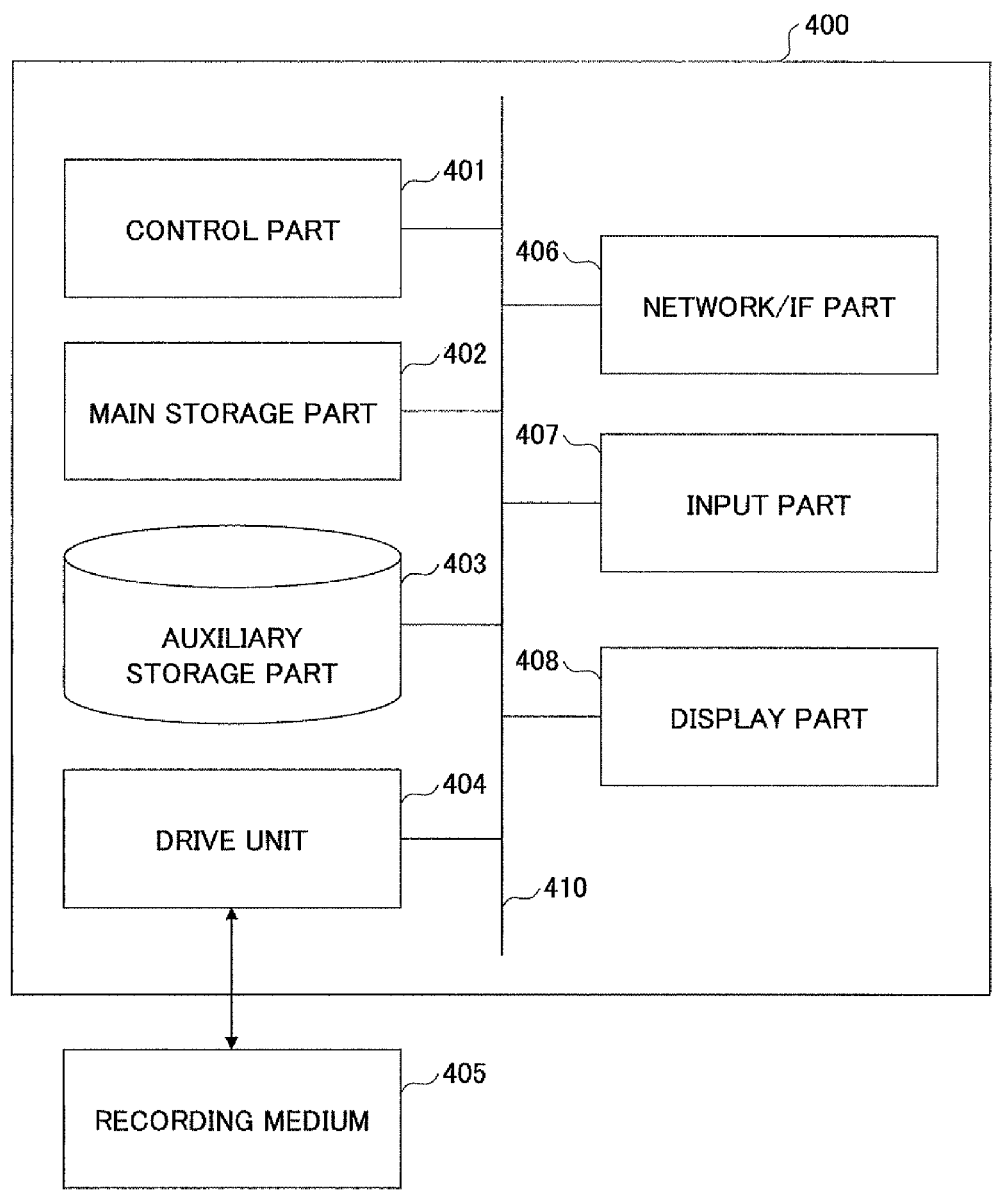
FIG. 19 is a block diagram depicting one example of a configuration of an image processing apparatus.

FIG. 19 is a block diagram depicting one example of a configuration of an image processing apparatus 400. The image processing apparatus 400 is one example of the motion picture coding apparatuses described above as the respective embodiments. As depicted in FIG. 19, the image processing apparatus 400 includes a control part 401, a main storage part 402, an auxiliary storage part 403, a drive unit 404, a network I/F part 406, an input part 407 and a display part 408. The respective parts and unit are mutually connected by a bus 410 in such a manner that they can mutually carry out data transmission and reception.

The control part 401 is a central processing unit (CPU) in a computer to carry out control of the respective parts and unit, and carry out logic and/or arithmetic operations on data or modifying data. Further, the control part 401 is an arithmetic and logic operation unit that executes a motion picture coding program that is stored in the main storage part 402 or the auxiliary storage part 403, receives data from the input part 407 or the storage part, carries out arithmetic and/or logic operations on the data or modifying the data, and outputs the data to the display part 408 or the storage part.

The control part 401 realizes the motion picture coding process described above according to the embodiments 1 and 2, by executing the motion picture coding program.

The main storage part 402 is a read-only memory (ROM), a random access memory (RAM) or the like, and is a storage that stores or temporarily holds programs (that may include the motion picture coding program) such as an operating system (OS) that is basic software the control part 401 executes, application software, and data.

The auxiliary storage part 403 is a hard disk drive (HDD) or the like, and a storage that stores data concerning the application software and so forth.

The drive unit 404 reads a program (that may be the motion picture coding program) from a recording medium 405, for example, a flexible disk, and installs the program in the storage part.

Further, the recording medium 405 stores a certain program (that may be the motion picture coding program), and the certain program stored in the recording medium 405 is installed in the image processing apparatus 400 via the drive unit 404. The image processing apparatus 400 may execute the certain program thus installed in the image processing apparatus 400.

The network I/F part 406 is an interface to be used for communications between the image processing apparatus 400 and a peripheral apparatus, which has a communication function and is connected via a network such as a local area network (LAN), a wide area network (WAN) or the like built using a data transmission path such as a wire or wireless circuit or line.

The input part 407 has a keyboard including cursor keys, numeral input and various function keys and so forth, a mouse for selecting keys on the screen of the display part 408, a slide pad, and so forth. Further, the input part 407 acts as a user interface for a user to give operation instructions, input data to the control part 401, and so forth.

The display part 408 includes a cathode ray tube (CRT), a liquid crystal display (LCD) or the like, and carries out a display according to display data that is input by the control part 401.

Thus, the motion picture coding process described above in the embodiments may be realized as the motion picture coding program to be executed by the computer. The above-described image coding process (including the motion picture coding process) or the image decoding process may be realized as a result of the motion picture coding program being installed from a server or the like and being executed by the computer.

Further, it is also possible that the motion picture coding program is stored in the recording medium 405, the recording medium 405 in which the motion picture coding program is stored is read by a computer or a portable terminal, and the above-described image coding process (including the motion picture coding process) or the image decoding process is realized by the computer or the portable terminal. It is noted that as specific examples of the recording medium 405, various types of recording media may be cited such as recording media optically, electrically or magnetically recording information such as a compact disc read-only memory (CD-ROM), a flexible disk, a magneto-optical disc, and so forth, semiconductor memories electrically recording information such as a read only memory (ROM), a flash memory and so forth. Further, the above-described image coding process (including the motion picture coding process) or the image decoding process described above for the respective embodiments may be implemented in one or plural integrated circuits.

The present disclosure aims at improving image quality for blocks for which referring to pixel values of upward adjacent blocks is not allowed, even when control is carried out at a low bit rate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that various changes, substitutions, and alterations could be made hereto without departing from the spirit and scope of the invention.

What is claimed is:

1. A motion picture coding apparatus including at least one processor and a non-transitory computer readable recording medium storing instructions executable by the at least one processor, the instructions configured to cause the at least one processor to perform a motion picture coding method when executed, comprising:

dividing an image into plural blocks and coding the plural blocks of the image;
determining, for each of the plural blocks, a coding mode to be used in the coding;
determining, for each of the plural blocks, a position of coefficients to be replaced by "0" among coefficients of direct current components after undergoing orthogonal transformation or quantization obtained for each of the plural blocks by the coding according to the coding mode determined for each of the plural blocks based on rate information;
determining whether a to-be-processed block of the plural blocks is a first block for which referring to pixel values of an upward adjacent block in the coding is not allowed;
changing, for coefficients direct current components after undergoing orthogonal transformation or quantization of the to-be-processed block determined as the first block, the determined position of coefficients to be replaced by "0" to reduce a number of coefficients to be replaced by "0"; and
replacing the coefficients of direct current components after undergoing orthogonal transformation or quantization of the to-be-processed block determined as the first block by "0" based on the position changed by the changing.

2. The motion picture coding apparatus as claimed in claim 1, wherein, in a case where the coding mode to be used to code the to-be-processed block is a first coding mode of separating into a block of direct current components and a block of alternating current components for carrying out the coding, the changing includes changing the first coding mode to be used to code the to-be-processed block to a coding mode among plural coding modes other than the first coding mode.

3. The motion picture coding apparatus as claimed in claim 2, wherein the changing includes changing the first coding mode to be used to code the to-be-processed block to a coding mode having a minimum coding cost among one or plural coding modes other than the first coding mode.

4. The motion picture coding apparatus as claimed in claim 1, wherein the determining the coding mode includes obtaining a determination result indicating whether the to-be-processed block is the first block, and determining to use a coding mode, other than a first coding mode of separating into a block of direct current components and a block of alternating current components for carrying out the coding, among plural coding modes, in a case where the to-be-processed block is the first block.

5. The motion picture coding apparatus as claimed in claim 1, wherein the first block is a block below a slice boundary.

6. A motion picture coding method comprising:
dividing an image into plural blocks and coding the plural blocks of the image;
determining, for each of the plural blocks, a coding mode to be used in the coding;
determining, for each of the plural blocks, a position of coefficients to be replaced by "0" among coefficients of direct current components after undergoing orthogonal transformation or quantization obtained for each of the plural blocks by the coding according to the coding mode determined for each of the plural blocks, based on rate information;
determining whether a to-be-processed block of the plural blocks is a first block for which referring to pixel values of an upward adjacent block in the coding is not allowed;
changing, for coefficients of direct current components after undergoing orthogonal transformation or quantization of the to-be-processed block determined as the first block, the determined position of coefficients to be replaced by "0" to reduce a number of coefficients to be replaced by "0"; and
replacing the coefficients of direct current components after undergoing orthogonal transformation or quantization of the to-be-processed block determined as the first block by "0" based on the position changed by the changing.

7. A non-transitory computer readable information recording medium storing a motion picture coding program which, when executed by one or more processors, causes a motion picture coding apparatus to carry out:
dividing an image into plural blocks and coding the plural blocks of the image;
determining, for each of the plural blocks, a coding mode to be used in the coding;
determining, for each of the plural blocks, a position of coefficients to be replaced by "0" among coefficients of direct current components after undergoing orthogonal transformation or quantization obtained for each of the plural blocks by the coding according to the coding mode determined for each of the plural blocks, based on rate information;
determining whether a to-be-processed block of the plural blocks is a first block for which referring to pixel values of an upward adjacent block in the coding is not allowed;
changing, for coefficients of direct current components after undergoing orthogonal transformation or quantization of the to-be-processed block determined as the first block, the determined position of coefficients to be replaced by "0" to reduce a number of coefficients to be replaced by "0"; and
replacing the coefficients of direct current components after undergoing orthogonal transformation or quantization of the to-be-processed block determined as the first block by "0" based on the changed position changed by the changing.

* * * * *

UNITED STATES PATENT AND TRADEMARK OFFICE
CERTIFICATE OF CORRECTION

PATENT NO. : 8,891,622 B2  
APPLICATION NO. : 13/462643  
DATED : November 18, 2014  
INVENTOR(S) : Hidenobu Miyoshi et al.

Page 1 of 1

It is certified that error appears in the above-identified patent and that said Letters Patent is hereby corrected as shown below:

In the Claims

Column 19, line 15, In Claim 1, after "coefficients" insert -- of --.
Column 20, line 51, In Claim 7, after "based on the" delete "changed".

Signed and Sealed this
Fifth Day of May, 2015

Michelle K. Lee
*Director of the United States Patent and Trademark Office*